(12) United States Patent
Khatri et al.

(10) Patent No.: US 11,907,386 B2
(45) Date of Patent: Feb. 20, 2024

(54) PLATFORM ROOT-OF-TRUST SYSTEM

(71) Applicant: Dell Products L.P., Round Rock, TX (US)

(72) Inventors: Mukund P. Khatri, Austin, TX (US); Robert W. Hormuth, Cedar Park, TX (US); Jimmy D. Pike, Georgetown, TX (US); Gaurav Chawla, Austin, TX (US); William Price Dawkins, Lakeway, TX (US); Elie Jreij, Pflugerville, TX (US); Mark Steven Sanders, Roanoke, VA (US); Walter A. O'Brien, III, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 763 days.

(21) Appl. No.: 17/027,835

(22) Filed: Sep. 22, 2020

(65) Prior Publication Data

US 2022/0092203 A1 Mar. 24, 2022

(51) Int. Cl.
  *G06F 21/62* (2013.01)
  *G06F 9/4401* (2018.01)
  *G06F 3/06* (2006.01)

(52) U.S. Cl.
  CPC .......... *G06F 21/6218* (2013.01); *G06F 3/061* (2013.01); *G06F 3/0652* (2013.01); *G06F 3/0679* (2013.01); *G06F 9/4401* (2013.01)

(58) Field of Classification Search
  CPC .... G06F 21/6218; G06F 3/061; G06F 3/0652; G06F 3/0679; G06F 9/4401
  See application file for complete search history.

(56) References Cited

U.S. PATENT DOCUMENTS 7,558,966 B2 *  7/2009  Durham ................ G06F 21/552
                                                 714/25
9,015,455 B2 *  4/2015  Held .................... G06F 21/575
                                                 713/1

(Continued)

OTHER PUBLICATIONS

Shoham, Michal "NVIDIA Announces Industry's First Secure SmartNIC Optimized for 25G," NVIDIA, Thursday, May 14, 2020, 2 Pages https://nvidianews.nvidia.com/news/nvidia-announces-industrys-first-secure-smartnic-optimized-for-25g.

*Primary Examiner* — Hosuk Song
(74) *Attorney, Agent, or Firm* — Joseph Mencher

(57) ABSTRACT

A platform root-of-trust system includes a System Control Processor (SCP) subsystem coupled to a central processing subsystem, a BIOS subsystem, and an I/O device. In response to an initialization instruction, the SCP subsystem begins initialization operations prior to the beginning of initialization operations for the central processing subsystem, the BIOS subsystem, and the I/O device. As part of SCP initialization operations, the SCP subsystem validates SCP subsystem initialization information to provide validated SCP subsystem initialization information, and uses the validated SCP subsystem initialization information to complete the SCP initialization operations. Subsequent to completing the SCP initialization operations, the SCP subsystem validates BIOS subsystem initialization information to provide validated BIOS subsystem initialization information for use by the BIOS subsystem in performing BIOS initialization operations, and validates I/O device initialization information to provide validated I/O device initialization information for use by the I/O device in performing I/O initialization operations.

20 Claims, 16 Drawing Sheets

(56) References Cited

U.S. PATENT DOCUMENTS

| | | |
|---|---|---|
| 9,384,367 B2 | 7/2016 | Swanson et al. |
| 10,592,254 B2 * | 3/2020 | Poornachandran ... G06F 1/3203 |
| 10,592,256 B2 * | 3/2020 | Luong ................... G06F 3/0484 |
| 10,776,492 B2 * | 9/2020 | Samuel ................. G06F 21/572 |
| 10,860,307 B2 * | 12/2020 | Suryanarayana ..... G06F 9/4411 |
| 11,157,623 B2 * | 10/2021 | Pappachan ............. G06F 13/28 |
| 11,683,172 B2 * | 6/2023 | Pike ......................... H04L 9/32 |
| | | 713/155 |

* cited by examiner

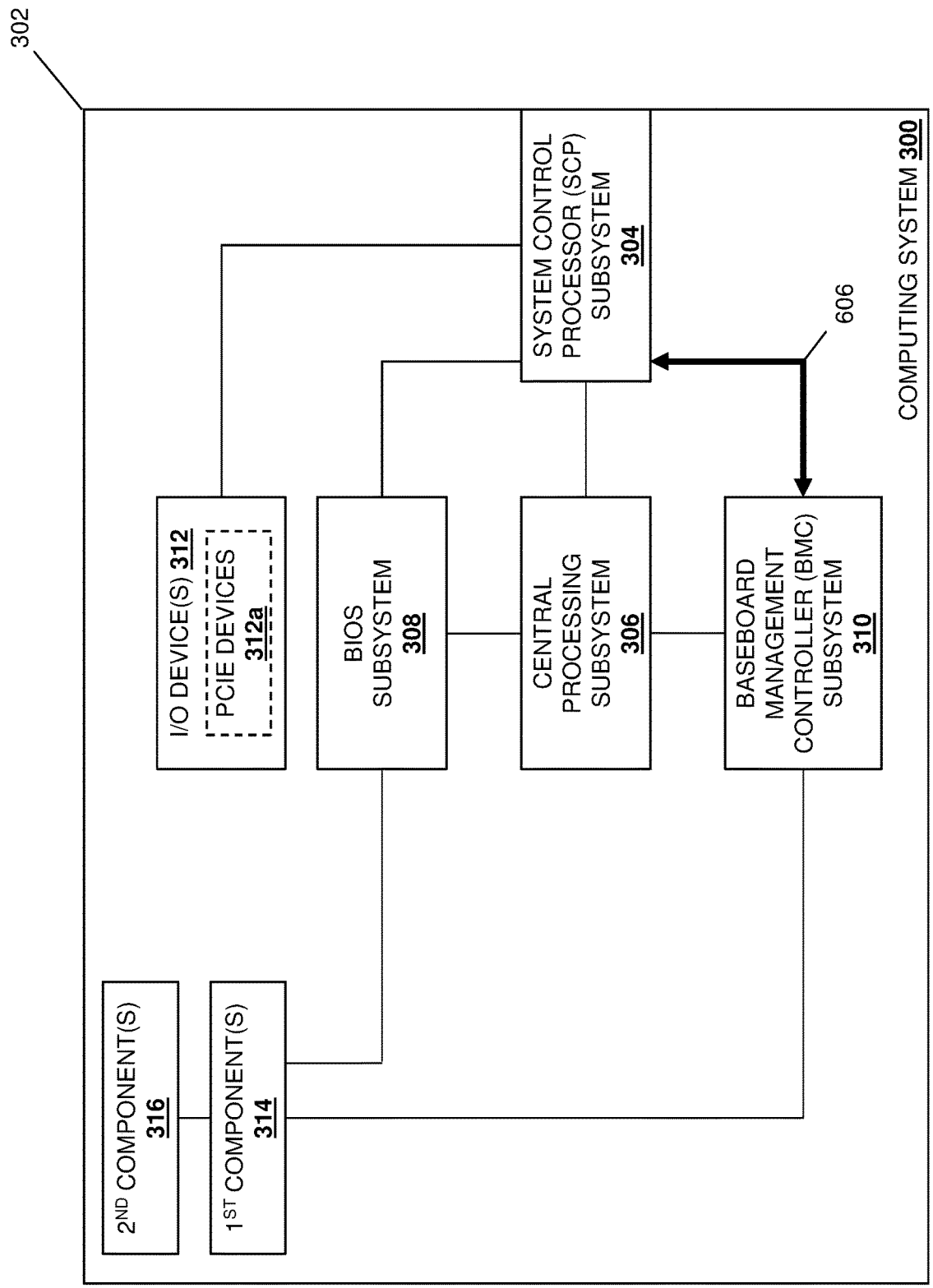

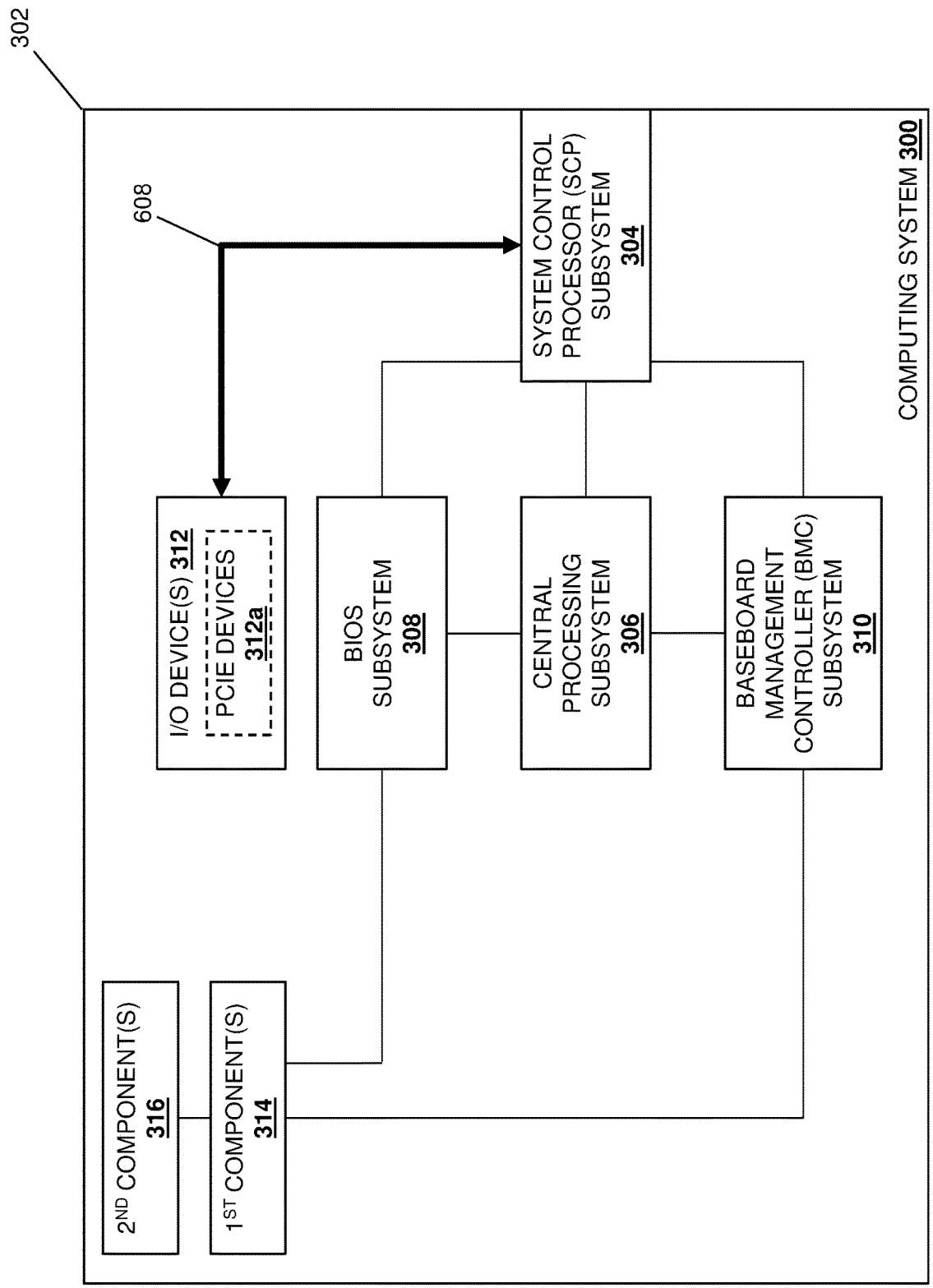

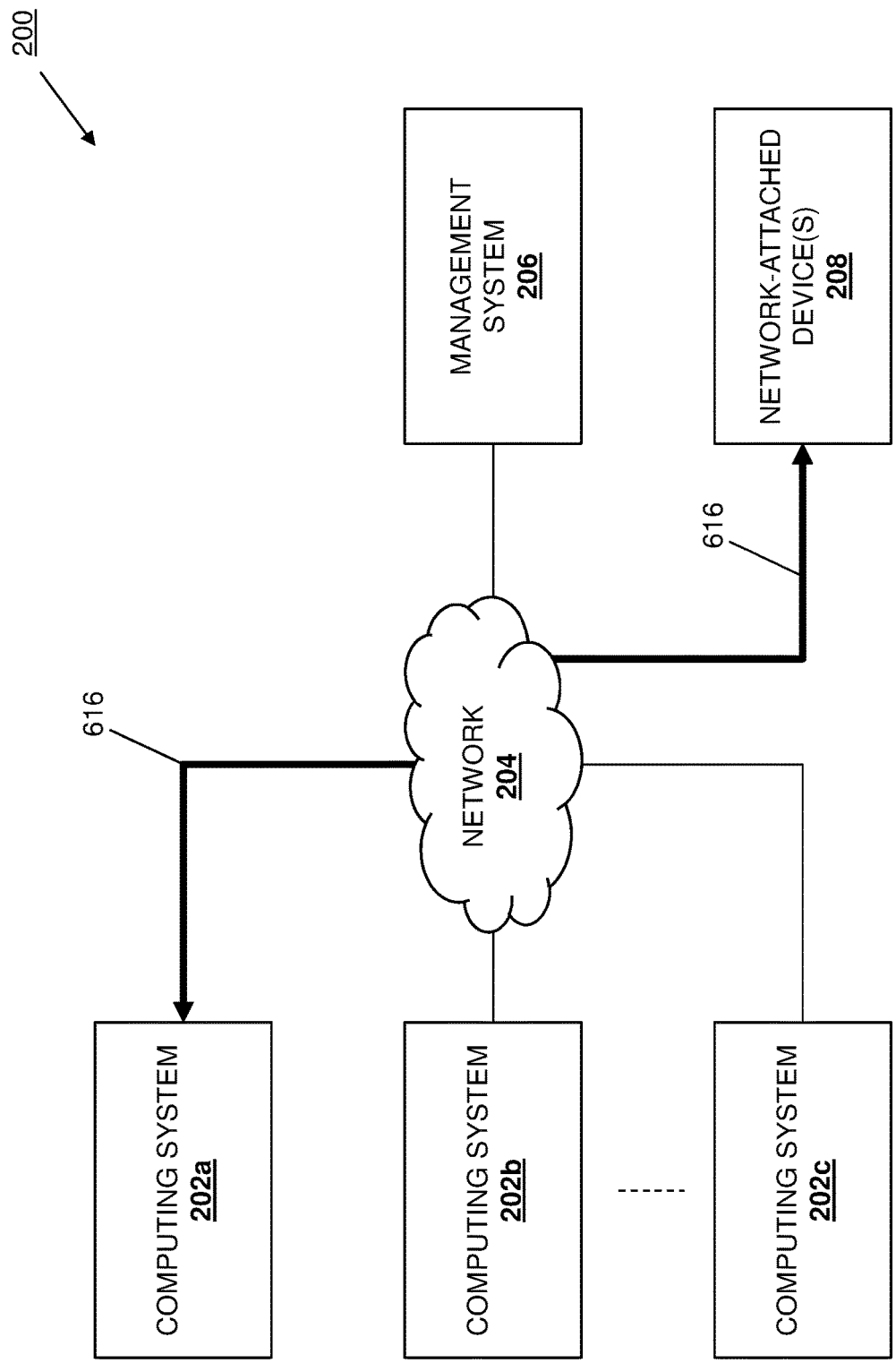

PLATFORM ROOT-OF-TRUST SYSTEM

BACKGROUND

The present disclosure relates generally to information handling systems, and more particularly to a platform root-of-trust for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing systems known in the art, may utilize a "root-of-trust" system that is configured to perform function(s) that are always trusted by that computing system (e.g., an operating system and/or other subsystems in the computing system). For example, computing systems may include various hardware, firmware, and software components, and the security mechanisms for those components may be rooted in the functions performed by the root-of-trust system. One conventional example of a root-of-trust system is provided by an integrated DELL® Remote Access Controller (iDRAC) device that may be conceptualized as an "enhanced" Baseboard Management Controller (BMC) device that operates as the root-of-trust system for the server device in which it is provided. However, such conventional root-of-trust systems suffer from a number of issues.

Conventional root-of-trust systems such as those provided by the iDRAC device discussed above operate to perform root-of-trust functions for components that are included in their server device or other computing device. However, many computing systems are moving to disaggregated system architectures in which components utilized by the computing system are provided external to the computing system (e.g., Non-Volatile Memory express (NMVe) storage devices located outside a chassis of the computing device and, in some situations, connected to the computing device via a network) and/or are connected to the computing system temporarily (e.g., Peripheral Component Interconnect express (PCIe) devices and/or other Input/Output (I/O) devices known in the art), with the possibility of those components being shared by that computing system with other computing systems, or moved between that computing system and other computing systems. Conventional root-of-trust systems do not provide a root of trust for such shared and/or external components, and instead require that those shared and/or external components operate as their own root-of-trust system, resulting in disaggregated architecture computing systems including multiple root-of-trust systems (e.g., a root-of-trust system provided by the iDRAC device discussed above, respective root-of-trust systems provided by each NVMe storage device connected to the computing system, respective root-of-trust systems provided by each PCIe device and/or other I/O device connected to the computing system, etc.)

Conventional root-of-trust systems that are native to the computing system (e.g., the "native" root-of-trust system provided by the iDRAC device discussed above) utilize "best-efforts" with regard to the security associated with other root-of-trust systems provided by components utilized by that computing system, which may include the native root-of-trust system requesting that any other root-of-trust systems perform root-of-trust functions. However, conventional native root-of-trust systems do not have the ability to verify root-of-trust functions have been performed by other root-of-trust systems, and thus must simply trust those other root-of-trust systems to operate securely. As such, in some embodiments, shared and/or external components provided for use by a computing system may be compromised (or may compromise themselves), which may allow them to compromise the computing system (e.g., due to those shared and/or external components being trusted by the native root-of-trust system in the computing system) by, for example, allowing unauthorized access to secure portions of that computing system.

Accordingly, it would be desirable to provide a root-of-trust system that addresses the issues discussed above.

SUMMARY

According to one embodiment, a System Control Processor (SCP) subsystem includes an SCP processing system; and an SCP memory system hat is coupled to the SCP processing and that includes instructions that, when executed by the SCP processor, cause the SCP processing to provide an SCP engine that is configured to: begin, in response to an initialization instruction, initialization operations for the SCP subsystem prior to the beginning of initialization operations for a central processing subsystem that is coupled to the SPC subsystem, a BIOS subsystem that is coupled to the SCP subsystem, and an I/O device that is coupled to the SCP subsystem; validate, as part of the initialization operations for the SCP subsystem, SCP subsystem initialization information to provide validated SCP subsystem initialization information; complete, using the validated SCP subsystem initialization information, the initialization operations for the SCP subsystem; validate, subsequent to completing the initialization operations for the SCP subsystem, BIOS subsystem initialization information to provide validated BIOS subsystem initialization information that is configured for use by the BIOS subsystem to perform initialization operations for the BIOS subsystem; and validate, subsequent to completing the initialization operations for the SCP subsystem, I/O device initialization information to provide validated I/O device initialization information that is configured for use by the I/O device to perform initialization operations for the I/O device.

BRIEF DESCRIPTION OF THE DRAWINGS

FIG. 6C is a schematic view illustrating an embodiment of the computing system of FIG. 3A operating during the method of FIG. 5.

FIG. 6D is a schematic view illustrating an embodiment of the computing system of FIG. 3A operating during the method of FIG. 5.

FIG. 6H is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
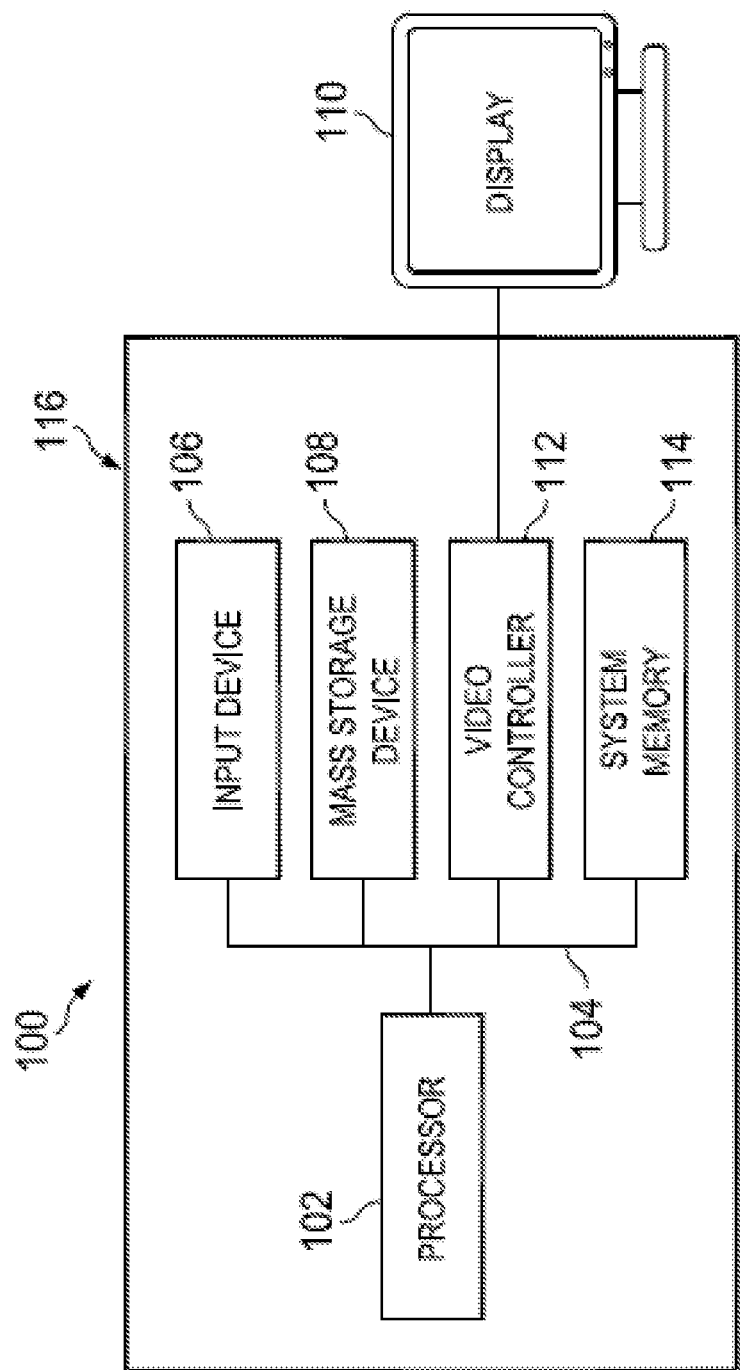
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
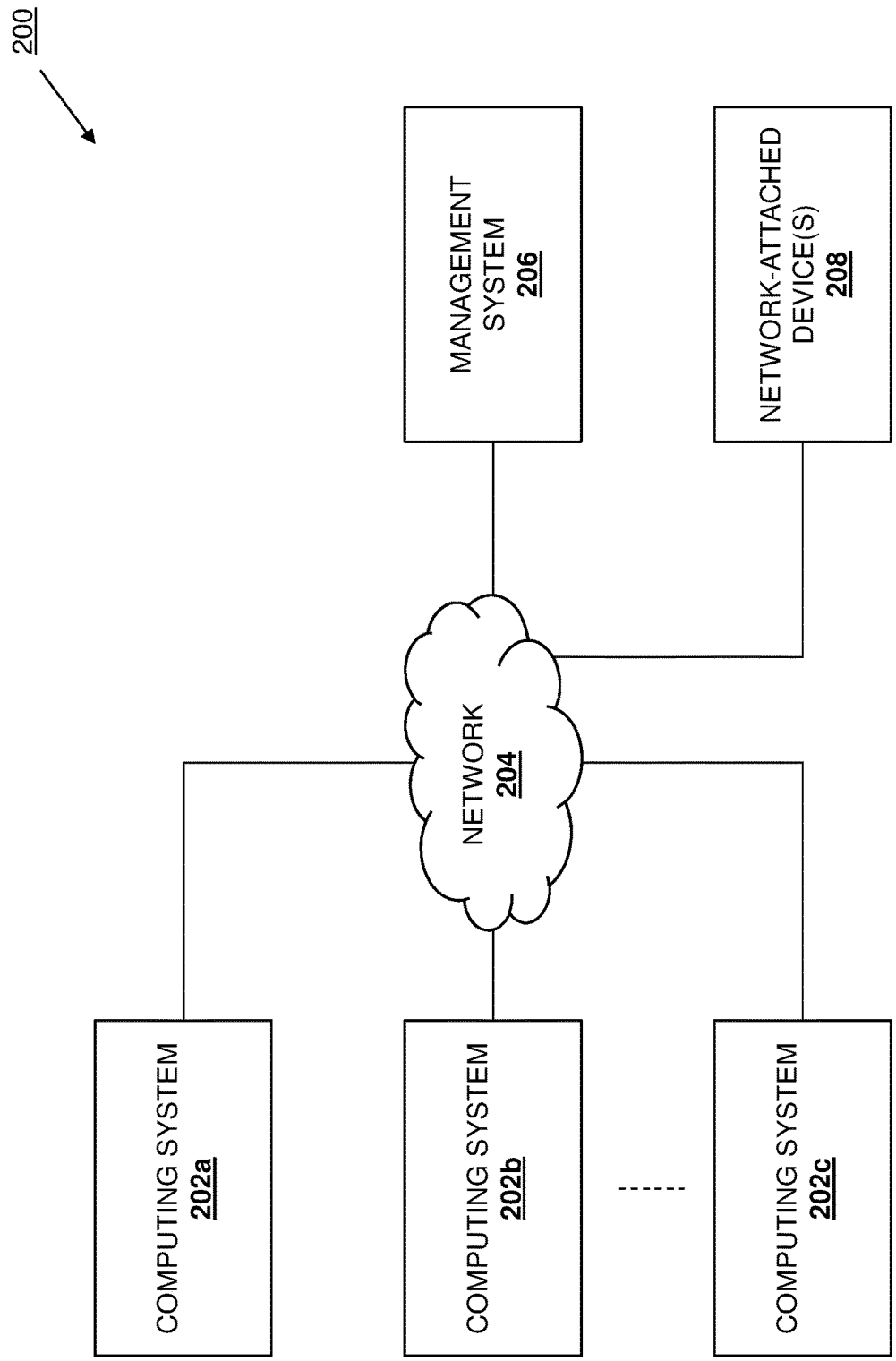
FIG. 2 is a schematic view illustrating an embodiment of a networked system.

Referring now to FIG. 2, an embodiment of a networked system 200 is illustrated in which the platform root-of-trust system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c. In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples below are discussed as being provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the platform root-of-trust system of the present disclosure may be utilized with a variety of components and component configurations, and/or may be provided in a variety of computing system/network configurations, while remaining within the scope of the present disclosure as well.

Figure 3A:
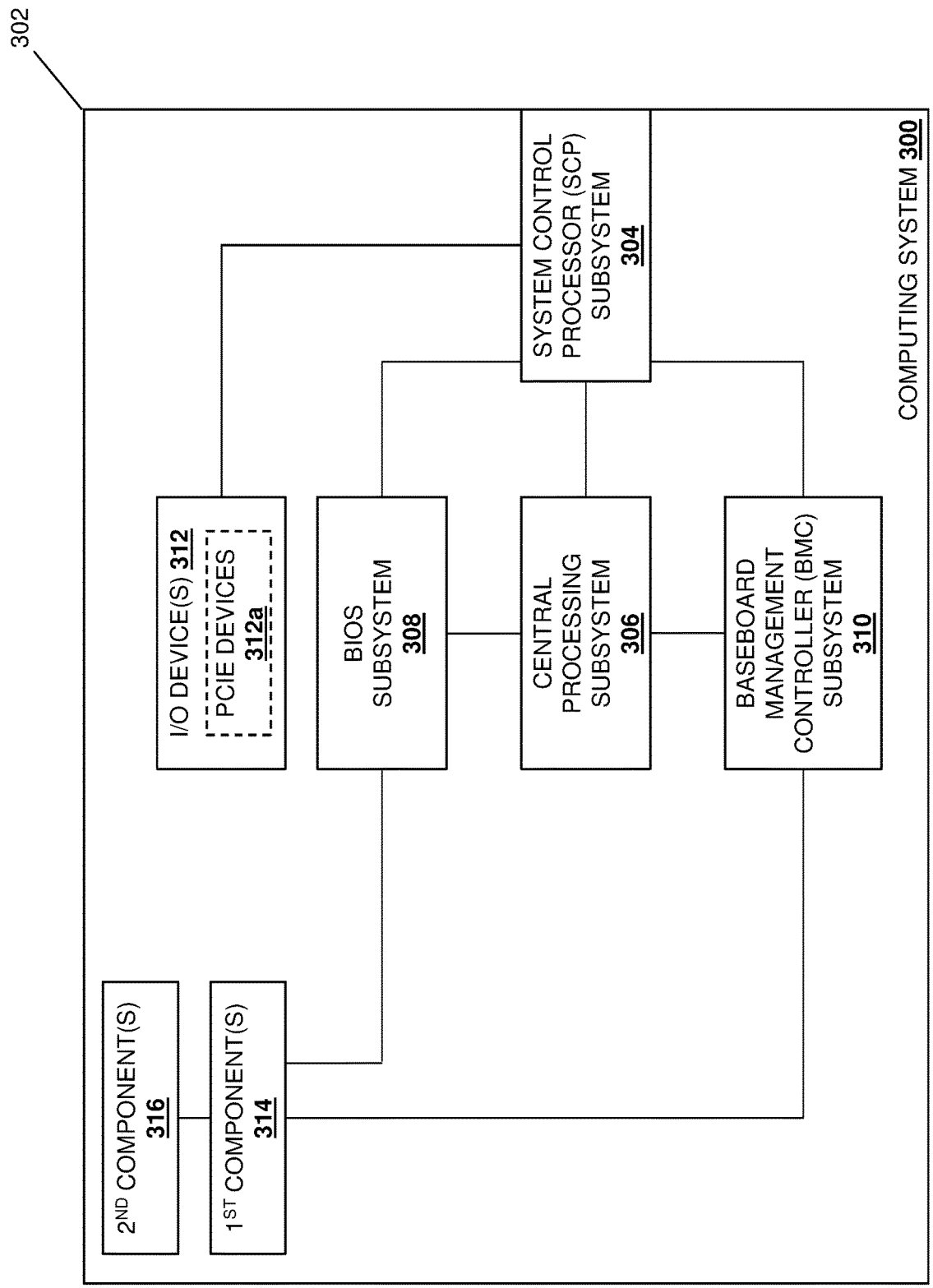
FIG. 3A is a schematic view illustrating an embodiment of a computing device that may be included in the networked system of FIG. 2 and that may utilize the platform root-of-trust system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing system that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the platform root-of-trust functionality that is discussed in further detail below. In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing system 306 that is coupled to the SCP subsystem 304, and which may include the processor 102 discussed above with reference to FIG. 1, a Central Processing Unit (CPU) such as a x86 host processor, and/or by a variety of other processing components that would be apparent to one of skill in the art in possession of the present disclosure. The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization process known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a Baseboard Management Controller (BMC) subsystem 310 that is coupled to the SCP subsystem 304, and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well.

Figure 3B:
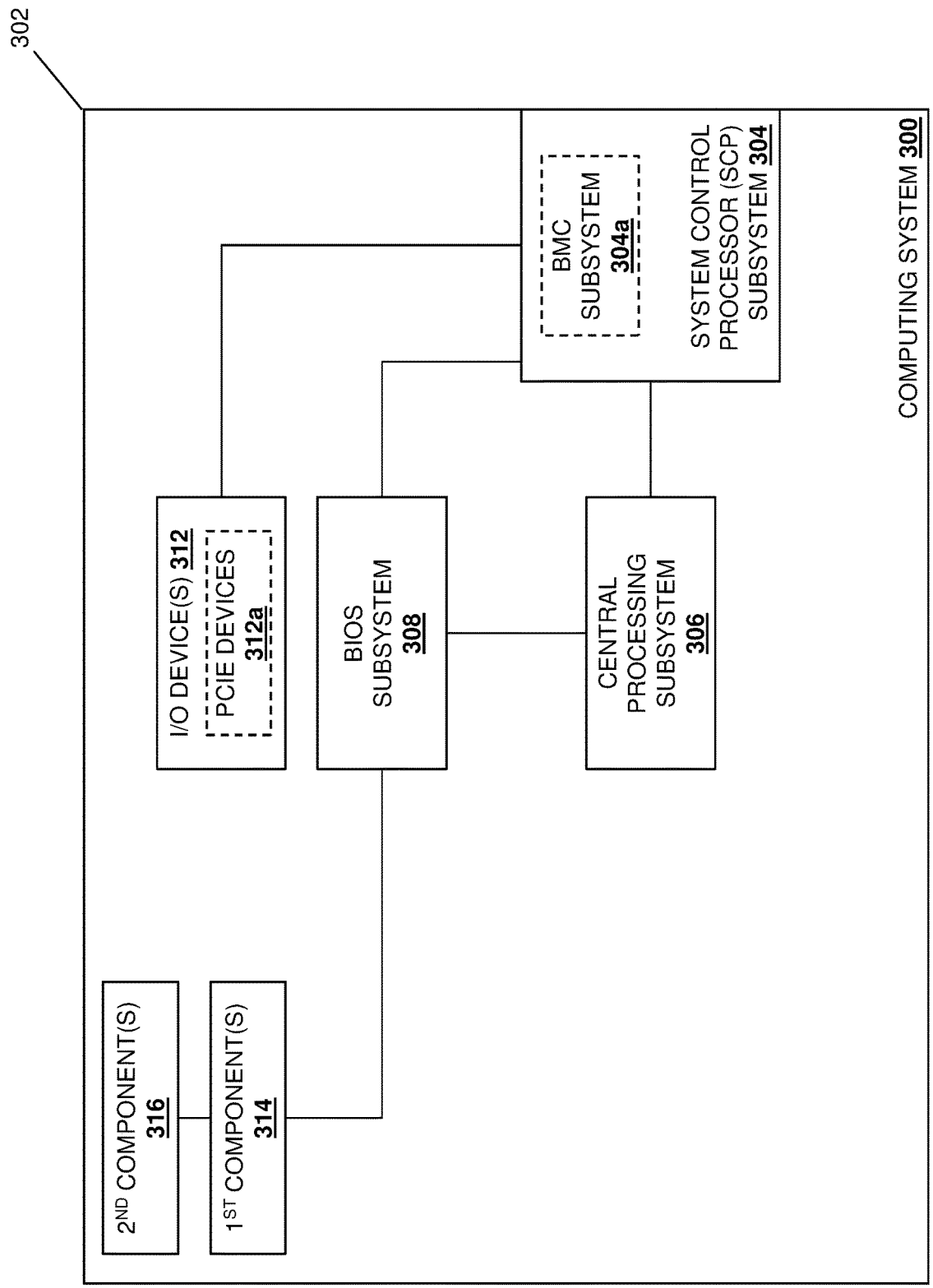
FIG. 3B is a schematic view illustrating an embodiment of a computing device that may be included in the networked system of FIG. 2 and that may utilize the platform root-of-trust system of the present disclosure.

The chassis 302 may also house one or more first components 314 that are coupled to each of the BIOS subsystem 308 and the BMC subsystem 310, and one or more second components 316 that are coupled to at least one of the first components 314. In the specific examples provided below, the first component(s) 314 may include a Complex Programmable Logic Device (CPLD) and a power system, while the second component(s) 316 may include a slave CPLD device, a storage backplane, a microcontroller, and battery firmware. However, one of skill in the art in possession of the present disclosure will recognize that the first component(s) 314 and the second component(s) 316 may include any of a variety of computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
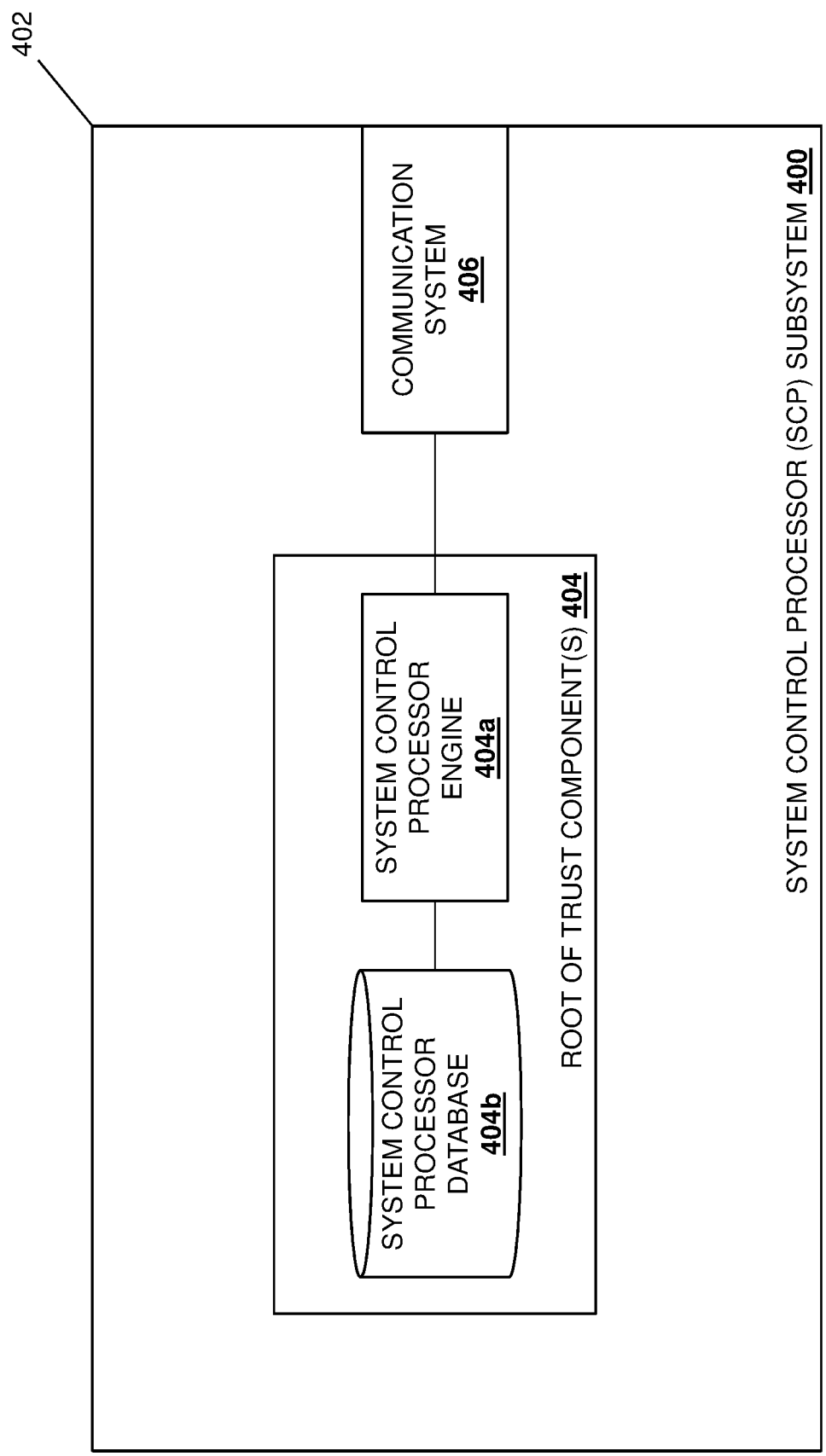
FIG. 4 is a schematic view illustrating an embodiment of a System Control Processor (SCP) subsystem that may be included in the computing device of FIG. 3A or 3B, and that may provide the platform root-of-trust system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below. In the illustrated embodiment, the SCP subsystem 400 includes a chassis 402 (e.g., a circuit board) that supports the components of the SCP subsystem 400, only some of which are illustrated below. For example, the chassis 302 may support root-of-trust components that may include root-of-trust hardware components (e.g., Silicon-based root-of-trust hardware) such as, for example, an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP engine 404a that is configured to perform the functionality of the SCP engines and/or SCP subsystems discussed below.

The root-of-trust component(s) 404 supported by the chassis 302 may also include root-of-trust hardware components (e.g., Silicon-based root-of-trust hardware) such as, for example, a storage system (not illustrated, but which may include the storage 108 discussed above with reference to FIG. 1, the SCP memory system discussed above, etc.) that is coupled to the SCP engine 404a (e.g., via a coupling between the storage system and the SCP processor) and that may include one or more SCP databases 404b that is configured to store any of the information utilized by the SCP engine 404a discussed below. As discussed in specific examples provided below, the SCP database(s) 404b/storage system root-of-trust hardware component may include a chassis-integrated/built-in, immutable, Read-Only Memory (ROM) subsystem that stores read-only instructions/code that are the first instructions/code executed by the SCP engine 404a subsequent to the powering-on of the computing system 300, an SCP firmware storage storing write-protected SCP firmware, and a public key storage that stores a public key for use (via the execution of the read-only instructions/code by the SCP engine 404a) in verifying that the SCP firmware has been signed by an authorized private key so that it may be executed by the SCP engine 404a to validate a boot of the SCP subsystem 400. However, while particular root-of-trust components are described, one of skill in the art in possession of the present disclosure will recognize that other components may be provided in the SCP subsystem 400 in order to achieve the SCP functionality discussed below while remaining within the scope of the present disclosure as well.

The chassis 402 may also support a communication system 406 that is coupled to the SCP engine 404a (e.g., via a coupling between the communication system 308 and the SCP processor) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 406 may include any of the connections discussed below between the SCP subsystem 400 and the network 204, the central processing subsystem 306, the BIOS subsystem 308, the BMC subsystem 310, the I/O device(s) 312, and/or any other components utilized with the computing system 202a/300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components and/or component configurations for providing the functionality discussed below while remaining within the scope of the present disclosure as well.

Figure 5A:
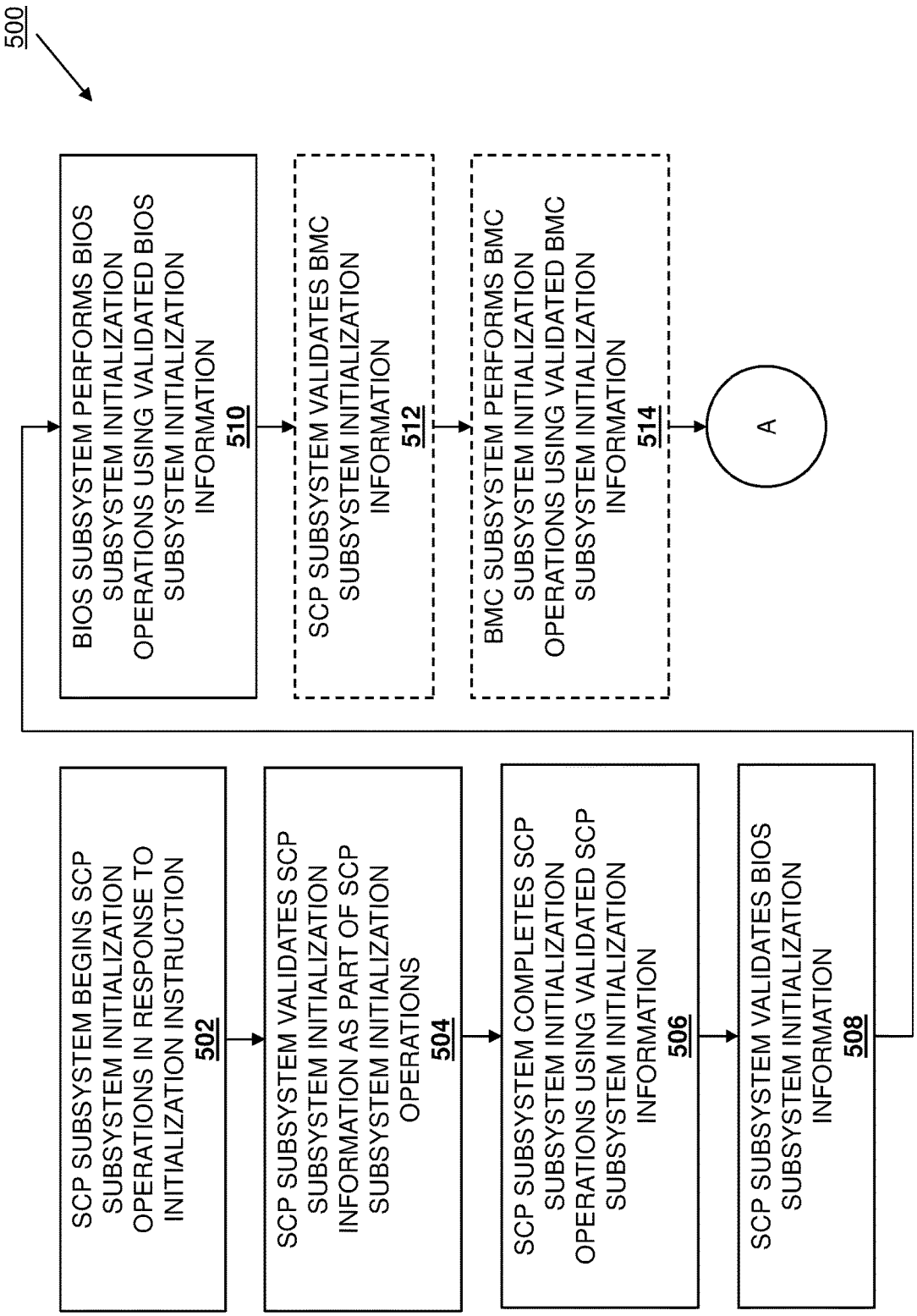
FIG. 5A is a flow chart illustrating an embodiment of a portion of method for providing a platform root-of-trust.
Figure 5B:
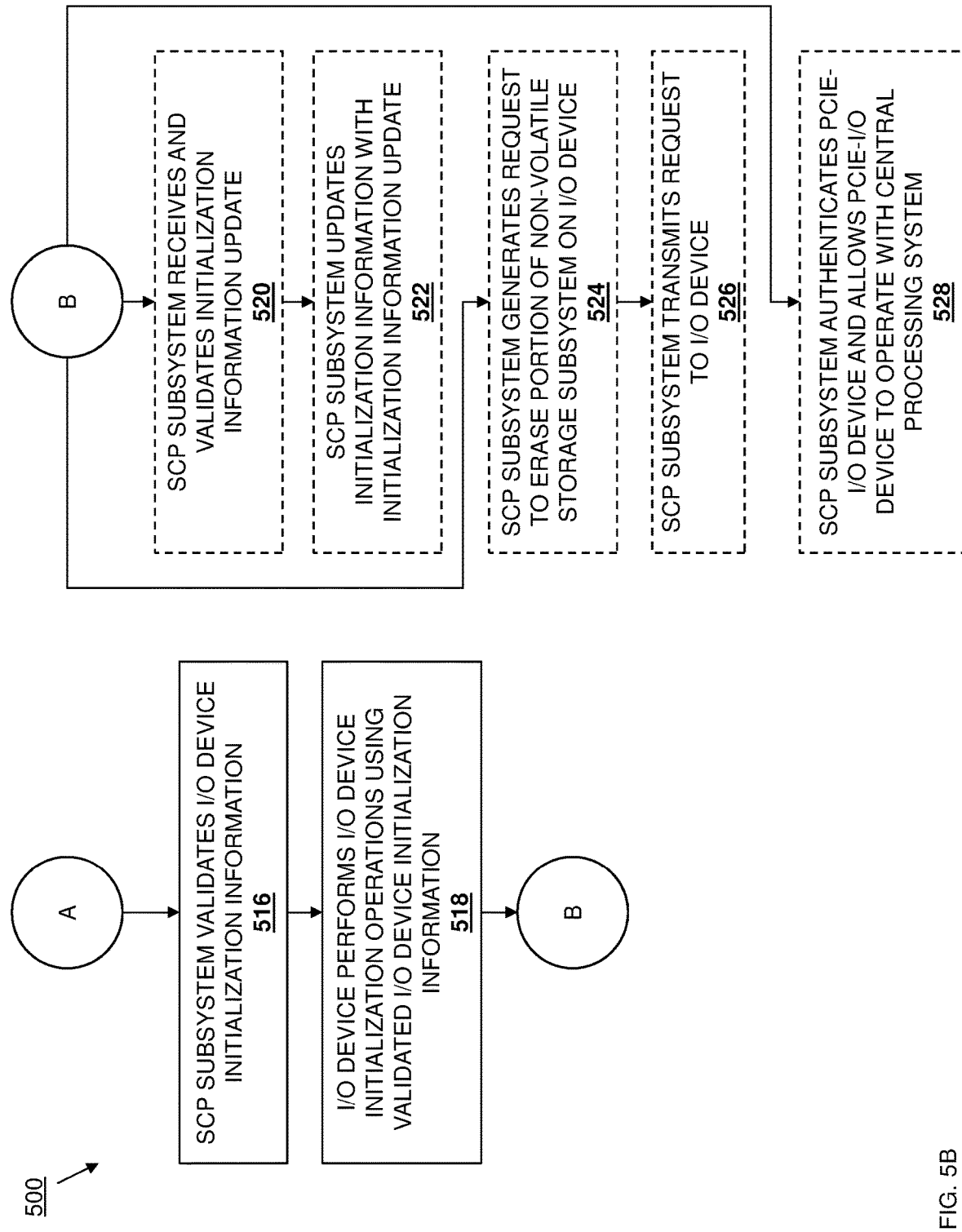
FIG. 5B is a flow chart illustrating an embodiment of a portion of method for providing a platform root-of-trust.

Referring now to FIGS. 5A and 5B, an embodiment of a method 500 for providing a platform root-of-trust is illustrated. As discussed below, the systems and methods of the present disclosure provide a System Control Processor (SCP) subsystem in a computing system that operates as a platform root-of-trust system that consolidates multiple root-of-trust systems that exist in conventional computing systems with disaggregated system architectures, thus providing a "security hub" for the computing system with regard to internal devices/subsystems, external devices/subsystems, shared devices/subsystem, and/or other disaggregated system architecture components known in the art. For example, the platform root-of-trust system of the present disclosure may include an SCP subsystem coupled to a central processing subsystem, a BIOS subsystem, and an I/O device. In response to an initialization instruction, the SCP subsystem begins initialization operations prior to the beginning of initialization operations for the central processing subsystem, the BIOS subsystem, and the I/O device. As part of SCP initialization operations, the SCP subsystem validates SCP subsystem initialization information to provide validated SCP subsystem initialization information, and uses the validated SCP subsystem initialization information to complete the SCP initialization operations. Subsequent to completing the SCP initialization operations, the SCP subsystem validates BIOS subsystem initialization information to provide validated BIOS subsystem initialization information for use by the BIOS subsystem in performing BIOS initialization operations, and validates I/O device initialization information to provide validated I/O device initialization information for use by the I/O device in performing I/O initialization operations. As such, the security of components (i.e., including shared and/or external components) provided for use by a computing system may be verified, thus ensuring that those components are not compromised, and preventing compromise of the computing system to prevent, for example, unauthorized access to secure portions of that computing system.

The method 500 begins at block 502 where an SCP subsystem begins SCP subsystem initialization operations in response to an initialization instruction. In an embodiment, at block 502, the computing system 202a/300 may be powered on, reset, rebooted, and/or otherwise initialized (e.g., via a user actuating a power button on the computing system, remotely initializing the computing system 202a/300, etc.) in order to provide an initialization instruction to the computing system 202a/300. However, while the examples below discuss the platform root-of-trust operations that are performed for the computing system 202a, one of skill in the art in possession of the present disclosure will appreciate that the computing systems 202b-202c may perform similar platform root-of-trust operations while remaining within the scope of the present disclosure as well.

As discussed in further detail below, the SCP subsystem 304/400 in the computing system 202a/300 is configured to provide an SCP domain that is the first domain in the computing system 202a/300 to "power up" in the platform/computing system 202a/300. As such, at block 502, in response to the initialization instruction, the SCP subsystem 304/400 may begin initialization operations prior to initialization operations beginning for any of the central processing subsystem 306, the BIOS subsystem 308, the BMC subsystem 310 (i.e., in embodiments where the BMC subsystem 310 is included in the computing system 202a/300), the I/O device(s) 312, the first components 314, the second component(s) 316, and/or other components included in, connected to, and/or otherwise provided for use by the computing system 202a/300. As will be appreciated by one of skill in the art in possession of the present disclosure, the initialization of the SCP subsystem 304/400 prior to other components included in, connected to, and/or otherwise provided for use by the computing system 202a/300, allows the SCP subsystem 304/400 to operate as the platform root-of-trust to validate, authenticate, verify, and/or otherwise ensure the security of any other component that will be utilized by the computing system 202a/300.

Figure 6A:
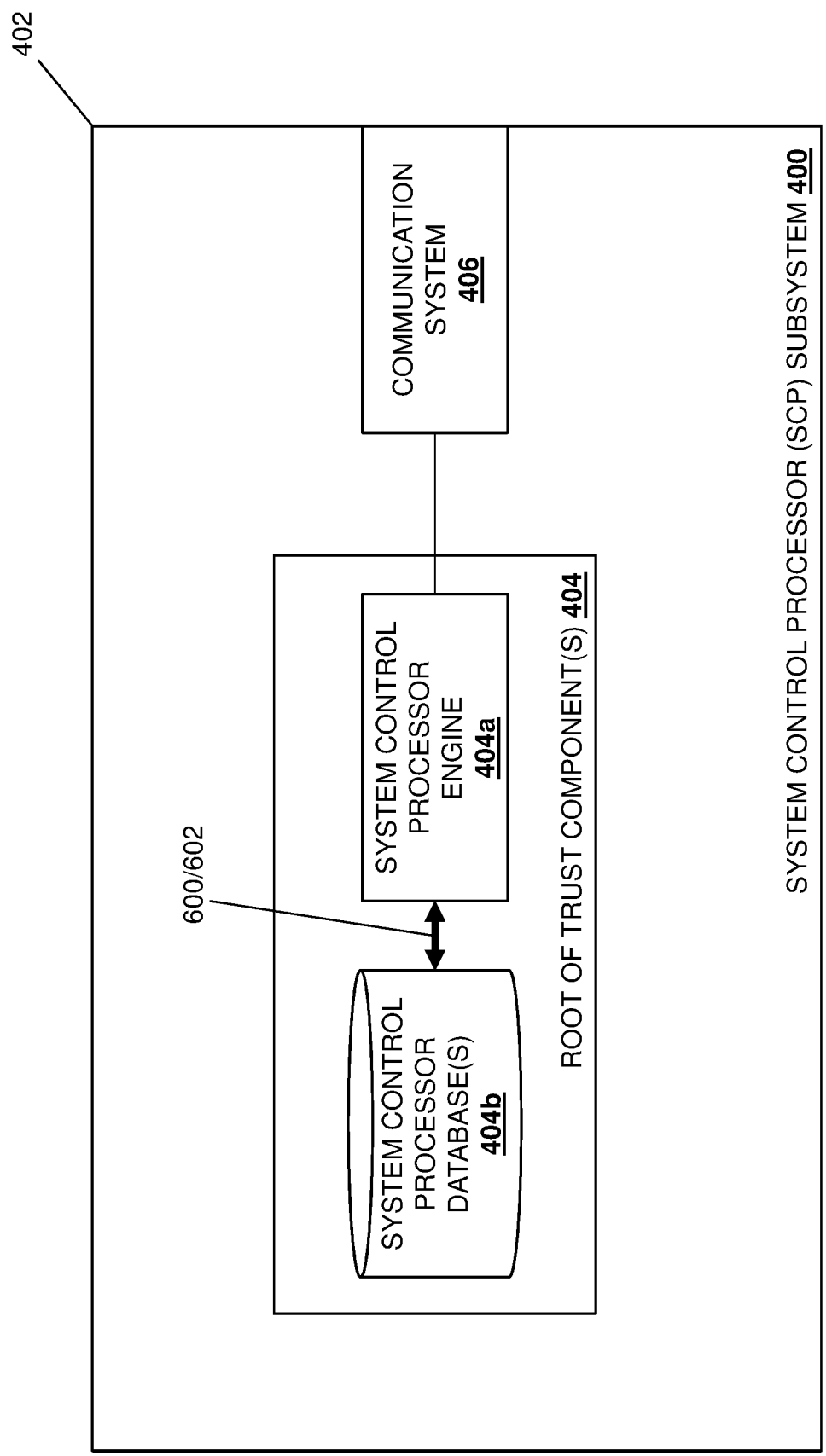
FIG. 6A is a schematic view illustrating an embodiment of the SCP subsystem of FIG. 4 operating during the method of FIG. 5.

The method 500 then proceeds to block 504 where the SCP subsystem validates SCP subsystem initialization information as part of SCP subsystem initialization operations. With reference to FIG. 6A, in an embodiment of block 504, the SCP subsystem 304/400 may perform SCP validation operations 600 that operate to validate SCP subsystem initialization information that allows for the SCP subsystem initialization operations discussed below. For example, the SCP database(s) 404b provided in the storage system included in the root-of-trust component(s) 404 in the SCP subsystem 304/400 may store SCP subsystem initialization information that may include, for example, SCP subsystem boot code that provide for the booting of the SCP subsystem 304/400, as well as any other SCP subsystem initialization information that would be apparent to one of skill in the art in possession of the present disclosure. In a specific example and as discussed above, the SCP database(s) 404b/storage system root-of-trust hardware component 404 may include a chassis-integrated/built-in, immutable, Read-Only Memory (ROM) subsystem that stores read-only instructions/code that are the first instructions/code executed by the SCP engine 404a subsequent to the powering-on of the computing system 202a/300, an SCP firmware storage storing write-protected SCP firmware, and a public key storage that stores a public key for use (via the execution of the read-only instructions/code discussed above by the SCP engine 404a) in verifying that the SCP firmware has been signed by an authorized private key before it is executed by the SCP engine 404a to validate a boot of the SCP subsystem 400.

As such, in an embodiment of block 504 and as the first operation performed subsequent to the initialization of the computing system 202a/300, the SCP engine 404a may execute read-only instructions/code stored on the SCP database(s) 404b in a chassis-integrated/built-in, immutable, Read-Only Memory (ROM) subsystem, retrieve a public key stored on the SCP database(s) 404b in a public key storage, use that public key to verify that write-protected SCP firmware stored in the SCP database(s) 404b in an SCP firmware storage has been signed with an authorized private key (corresponding to the public key) in order to validate that write-protected SCP firmware (which provides the SCP subsystem initialization information in this example), and/or perform any other validation operations that would be apparent to one of skill in the art in possession of the present disclosure. However, while specific components and specific information are described above as being utilized to verify the SCP subsystem initialization information, one of skill in the art in possession of the present disclosure will appreciate that other components and/or information may be utilized with other validation techniques while remaining within the scope of the present disclosure as well.

The method 500 then proceeds to block 506 where the SCP subsystem completes the SCP subsystem initialization operations using the validated SCP subsystem initialization information. With continued reference to FIG. 6A, in an embodiment of block 506 and in response to validating the SCP subsystem initialization information, the SCP engine 404a may perform SCP initialization operations 602 that operate to utilize validated SCP subsystem initialization information to complete the SCP subsystem initialization operations. Continuing with the specific example provided above, in response to determining that the write-protected SCP firmware has been signed with an authorized private key (corresponding to the public key discussed above), the SCP firmware becomes "validated" SCP firmware, and the SCP engine 404a may utilize that validated SCP firmware to complete the initialization operations for the SCP subsystem 304/400. However, one of skill in the art in possession of the present disclosure will appreciate how any of a variety of SCP subsystem initialization information may be validated to provide validated SCP subsystem information that may then be used to complete SCP subsystem initialization operations while remaining within the scope of the present disclosure as well.

Furthermore, one of skill in the art in possession of the present disclosure will also recognize that, in the event SCP subsystem initialization information cannot be validated (e.g., the SCP engine 404a determines that the write-protected SCP firmware has not been signed with an authorized private key corresponding to the public key discussed above), the SCP subsystem 304/400 may generate an error message, shut down, and/or otherwise prevent further initialization operations for the computing system 202a/300. However, in some embodiments and in the event SCP subsystem initialization information cannot be validated, the SCP engine 404a may access different SCP subsystem initialization information (e.g., an earlier version of the SCP firmware discussed above, a recovery image for the SCP subsystem 304/400, etc.) and attempt to validate that SCP subsystem initialization information similarly as discussed above, which one of skill in the art in possession of the present disclosure will recognize may allow the SCP subsystem 304/400 to complete initialization operations (i.e., with a different/earlier version of the SCP subsystem initialization information) and proceed with the initialization of the computing system 202a/300 as discussed below.

One of skill in the art in possession of the present disclosure will recognize that providing the SCP subsystem 304/400 as the first subsystem/domain to be powered up/initialized in the computing system 202a/300, along with the use of the root-of-trust components 404a in the SCP subsystem 304/400 that ensure a verified boot or other initialization of the SCP subsystem 304/400, establishes the SCP subsystem 304/400 as the platform root-of-trust for the computing system 202a/300 by validating, authenticating, verifying, and/or otherwise ensuring the secure operation of the SPC subsystem 304/400 by ensuring that the SCP subsystem 304/400 utilizes only secure components (e.g., hardware, software, firmware, and/or other components known in the art) as part of any of its operations.

Figure 6B:
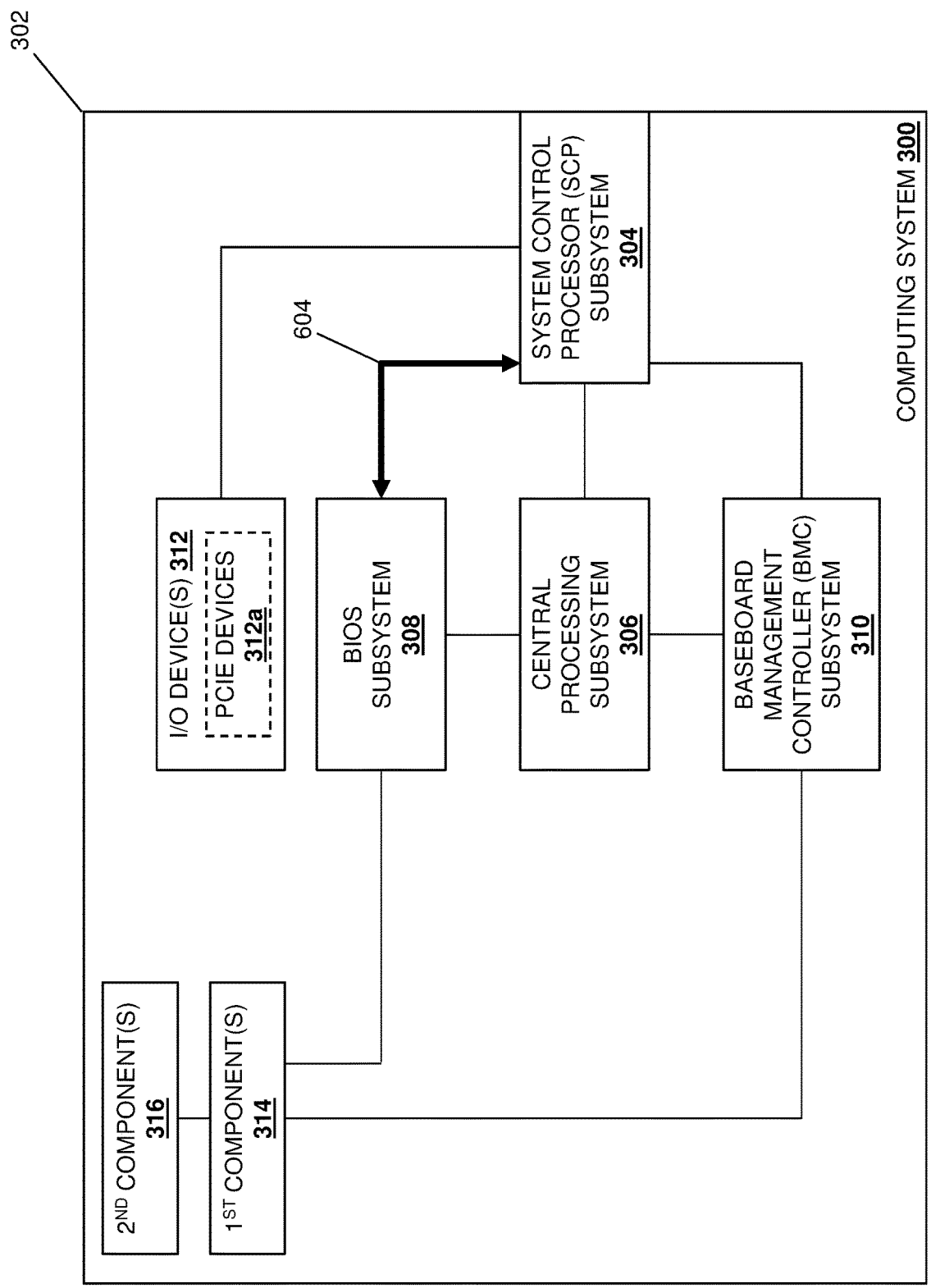
FIG. 6B is a schematic view illustrating an embodiment of the computing system of FIG. 3A operating during the method of FIG. 5.

The method 500 then proceeds to block 508 where the SCP subsystem validates BIOS subsystem initialization information. With reference to FIG. 6B, in an embodiment of block 508, the SCP subsystem 304/400 may perform BIOS subsystem validation operations 604 in order to validate BIOS subsystem initialization information that allows for the BIOS subsystem initialization operations discussed below. For example, the BIOS subsystem 308 or the computing system 202a/300 may include a storage device such as, for example, a Serial Peripheral Interface (SPI) device, that stores BIOS subsystem initialization information such as, for example, SPI/BIOS boot code. In an embodiment, prior to or during block 508, the BIOS subsystem 308 may be provided power, and the SCP engine 404a in the SCP subsystem 304/400 may access the BIOS subsystem initialization information for the BIOS subsystem 308 and use a public key (e.g., that is stored in the SCP database(s) 404b to determine whether that BIOS subsystem initialization information is signed with an authorized private key. However, while specific components and specific information are described above as being utilized to verify the BIOS subsystem initialization information, one of skill in the art in possession of the present disclosure will appreciate that other components and/or information may be utilized with other validation techniques while remaining within the scope of the present disclosure as well.

Continuing with the specific example provided above, in response to determining that the SPI/BIOS boot code has been signed with an authorized private key (corresponding to the public key discussed above), the SPI/BIOS boot code becomes "validated" SPI/BIOS boot code. However, one of skill in the art in possession of the present disclosure will appreciate how any of a variety of BIOS subsystem initialization information may be validated to provide validated BIOS subsystem information while remaining within the scope of the present disclosure as well. Furthermore, one of skill in the art in possession of the present disclosure will also recognize that, in the event BIOS subsystem initialization information cannot be validated (e.g., the SCP engine 404a determines that the SPI/BIOS boot code has not been signed with an authorized private key corresponding to the public key discussed above), the SCP subsystem 304/400 may generate an error message, shut down, and/or otherwise prevent further initialization operations for the computing system 202a/300. However, in some embodiments and in the event BIOS subsystem initialization information cannot be validated, the SCP engine 404a may access different BIOS subsystem initialization information (e.g., an earlier version of the SPI/BIOS boot code discussed above, a recovery image for the BIOS subsystem 308, etc.) and attempt to validate that BIOS subsystem initialization information similarly as discussed above, which one of skill in the art in possession of the present disclosure will recognize may allow the BIOS subsystem 308 to complete initialization operations (i.e., with a different/earlier version of the BIOS subsystem initialization information) such that the computing system 202a/300 may proceed with initialization as discussed below.

The method 500 then proceeds to block 510 where a BIOS subsystem performs BIOS subsystem initialization operations using the validated BIOS subsystem initialization information. In an embodiment, at block 510 and following the validation of the BIOS subsystem initialization information at block 508, a BIOS processing system in the BIOS subsystem 308 may utilize the validated BIOS subsystem initialization information to complete initialization operations for the BIOS subsystem 308, which one of skill in the art in possession of the present disclosure will recognize may allow the BIOS subsystem 308 to perform any of a variety of BIOS operations known in the art. Thus, one of skill in the art in possession of the present disclosure will recognize that the use of the "validated" SCP subsystem 304/400 that is been established as the platform root-of-trust to validate the BIOS subsystem initialization information ensures a verified boot or other initialization of the BIOS subsystem 308, establishing a "chain of trust" between the SCP subsystem 304/400 and the BIOS subsystem 308 by validating, authenticating, verifying, and/or otherwise ensuring the secure operation of the BIOS subsystem 308 by ensuring that the BIOS subsystem 308 utilizes only secure components (e.g., software, firmware, and/or other components known in the art) as part of any of its operations.

In some embodiments, following block 510, the method 500 may then proceed to block optional block 512 where the SCP subsystem validates BMC subsystem initialization information. With reference to FIG. 6C, in an embodiment of optional block 512, the SCP subsystem 304/400 may perform BMC subsystem validation operations 606 in order to validate BMC subsystem initialization information that allows for the BMC subsystem initialization operations discussed below. For example, the BMC subsystem 310 or the computing system 202a/300 may include a storage device that stores BMC subsystem initialization information such as, for example, BMC firmware. In an embodiment, prior to or during optional block 512, the BMC subsystem 310 may be provided power, and the SCP engine 404a in the SCP subsystem 304/400 may access the BMC subsystem initialization information for the BMC subsystem 310, and use a public key (e.g., that is stored in the SCP database(s) 404b to determine whether that BMC subsystem initialization information is signed with an authorized private key. However, while specific components and specific information are described above as being utilized to verify the BMC subsystem initialization information, one of skill in the art in possession of the present disclosure will appreciate that other components and/or information may be utilized with other validation techniques while remaining within the scope of the present disclosure as well. For example, public keys for the BMC subsystem 310, the BIOS subsystem 308, I/O devices, etc. may be stored in the management system 206 (e.g., an SCP manager) and retrieved by the SCP subsystem 304/400 via the network 204 while remaining within the scope of the present disclosure.

Continuing with the specific example provided above, in response to determining that the BMC firmware has been signed with an authorized private key (corresponding to the public key discussed above), the BMC firmware becomes "validated" BMC firmware. However, one of skill in the art in possession of the present disclosure will appreciate how any of a variety of BMC subsystem initialization information may be validated to provide validated BMC subsystem information while remaining within the scope of the present disclosure as well. Furthermore, one of skill in the art in possession of the present disclosure will also recognize that, in the event BMC subsystem initialization information cannot be validated (e.g., the SCP engine 404a determines that the BMC firmware has not been signed with an authorized private key corresponding to the public key discussed above), the SCP subsystem 304/400 may generate an error message, shut down, and/or otherwise prevent further initialization operations for the computing system 202a/300. However, in some embodiments and in the event BMC subsystem initialization information cannot be validated, the SCP engine 404a may access different BMC subsystem initialization information (e.g., an earlier version of the BMC firmware discussed above, a recovery image for the BMC subsystem 310, etc.) and attempt to validate that BMC subsystem initialization information similarly as discussed above, which one of skill in the art in possession of the present disclosure will recognize may allow the BMC subsystem 310 to complete initialization operations (i.e., with a different/earlier version of the BMC subsystem initialization information) such that the computing system 202a/300 may proceed with initialization as discussed below.

The method 500 then proceeds to optional block 514 where a BMC subsystem performs BMC subsystem initialization operations using the validated BMC subsystem initialization information. In an embodiment, at optional block 514 and following the validation of the BMC subsystem initialization information at optional block 512, a BMC processing system in the BMC subsystem 310 may utilize the validated BMC subsystem initialization information to complete initialization operations for the BMC subsystem 310, which one of skill in the art in possession of the present disclosure will recognize may allow the BMC subsystem 310 to perform any of a variety of BMC operations known in the art. Thus, one of skill in the art in possession of the present disclosure will recognize that the use of the "validated" SCP subsystem 304/400 that is been established as the platform root-of-trust to validate the BMC subsystem initialization information ensures a verified boot or other initialization of the BMC subsystem 310, establishing a "chain of trust" between the SCP subsystem 304/400 and the BMC subsystem 310 by validating, authenticating, verifying, and/or otherwise ensuring the secure operation of the BMC subsystem 310 by ensuring that the BMC subsystem 310 utilizes only secure components (e.g., software, firmware, and/or other components known in the art) as part of any of its operations.

As will be appreciated by one of skill in the art in possession of the present disclosure, optional blocks 512 and 514 may be performed with computing systems such as the computing system 300 discussed above with reference to FIG. 3A that includes a BMC subsystem 310, but may be omitted with computing systems such as the computing system 300 discussed above with reference to FIG. 3B that does not include the BMC subsystem 310 discussed above with reference to FIG. 3A. Rather, with computing systems such as the computing system 300 discussed above with reference to FIG. 3B, the BMC subsystem 304a provided by the SCP subsystem 304/400 may be validated as part of the validation of the SCP subsystem 304/400 described above with reference to blocks 502-506, and thus subsequent to block 506 the SCP subsystem 304/400 to perform any of a variety of BMC operations (e.g., remote management operations) known in the art.

Following optional block 514 (or block 510 when optional blocks 512 and 514 are not performed), the method 500 then proceeds to block 516 where the SCP subsystem validates I/O device initialization information. With reference to FIG. 6D, in an embodiment of block 516, the SCP subsystem 304/400 may perform I/O device validation operations 608 in order to validate I/O device initialization information that allows for the I/O device initialization operations discussed below. For example, the I/O device(s) 312 or the computing system 202a/300 may include storage subsystem(s) that store I/O device initialization information such as, for example, I/O device firmware. In an embodiment, prior to or during block 516, the I/O device(s) 312 may be provided power, and the SCP engine 404a in the SCP subsystem 304/400 may access the I/O device initialization information for the I/O device(s) 312 and use a public key (e.g., that is stored in the SCP database(s) 404b to determine whether that I/O device initialization information is signed with an authorized private key. In a specific example, the SCP subsystem 304/400 may be coupled to the I/O device(s) 312/PCIe device(s) 312a via a sideband bus that provides for access to the I/O device(s) 312 while a host (PCIe) bus adapter is unavailable, thus allowing the SCP subsystem 304/400 to perform the I/O device validation operations 608 before the I/O devices are allowed to proceed with their initialization operations/boot flow. However, while specific components and specific information are described above as being utilized to verify the I/O device initialization information, one of skill in the art in possession of the present disclosure will appreciate that other components and/or information may be utilized with other validation techniques while remaining within the scope of the present disclosure as well.

Continuing with the specific example provided above, in response to determining that the I/O device firmware has been signed with an authorized private key (corresponding to the public key discussed above), the I/O device firmware becomes "validated" I/O device firmware. However, one of skill in the art in possession of the present disclosure will appreciate how any of a variety of I/O device initialization information may be validated to provide validated I/O device information while remaining within the scope of the present disclosure as well. Furthermore, one of skill in the art in possession of the present disclosure will also recognize that, in the event I/O device initialization information cannot be validated (e.g., the SCP engine 404a determines that the I/O device firmware has not been signed with an authorized private key corresponding to the public key discussed above), the SCP subsystem 304/400 may generate an error message, shut down that I/O device, and/or otherwise prevent further initialization operations for that I/O device such that it may not be utilized with the computing system 202a/300. However, in some embodiments and in the event I/O device initialization information cannot be validated, the SCP engine 404a may access different I/O device initialization information (e.g., an earlier version of the I/O device firmware discussed above, a recovery image for the I/O device 312, etc.) and attempt to validate that I/O device initialization information similarly as discussed above, which one of skill in the art in possession of the present disclosure will recognize may allow that I/O device 312 to complete initialization operations (i.e., with a different/earlier version of the I/O device initialization information) such that that I/O device 312 may proceed with initialization as discussed below.

The method 500 then proceeds to block 518 where I/O device(s) performs I/O device initialization operations using the validated I/O device initialization information. In an embodiment, at block 518 and following the validation of the I/O device initialization information at block 516, I/O device processing system(s) in the I/O device(s) 312 may utilize the validated I/O device initialization information to complete initialization operations for the I/O device(s) 312, which one of skill in the art in possession of the present disclosure will recognize may allow the I/O device(s) 312 to perform any of a variety of I/O device operations known in the art. Thus, one of skill in the art in possession of the present disclosure will recognize that the use of the "validated" SCP subsystem 304/400 that is been established as the platform root-of-trust to validate the I/O device initialization information ensures a verified boot or other initialization of the I/O device(s) 312, establishing a "chain of trust" between the SCP subsystem 304/400 and the I/O device(s) 312 by validating, authenticating, verifying, and/or otherwise ensuring the secure operation of the I/O device(s) 312 by ensuring that the I/O device(s) 312 utilizes only secure components (e.g., software, firmware, and/or other components known in the art) as part of any of their operations. As will be appreciated by one of skill in the art in possession of the present disclosure, the validation and initialization of the I/O device(s) discussed above may include the validation and initialization of any of the PCIe device(s) 312a included in the I/O device(s) 312, as well as any other I/O device(s) that would be apparent to one of skill in the art in possession of the present disclosure.

Figure 6E:
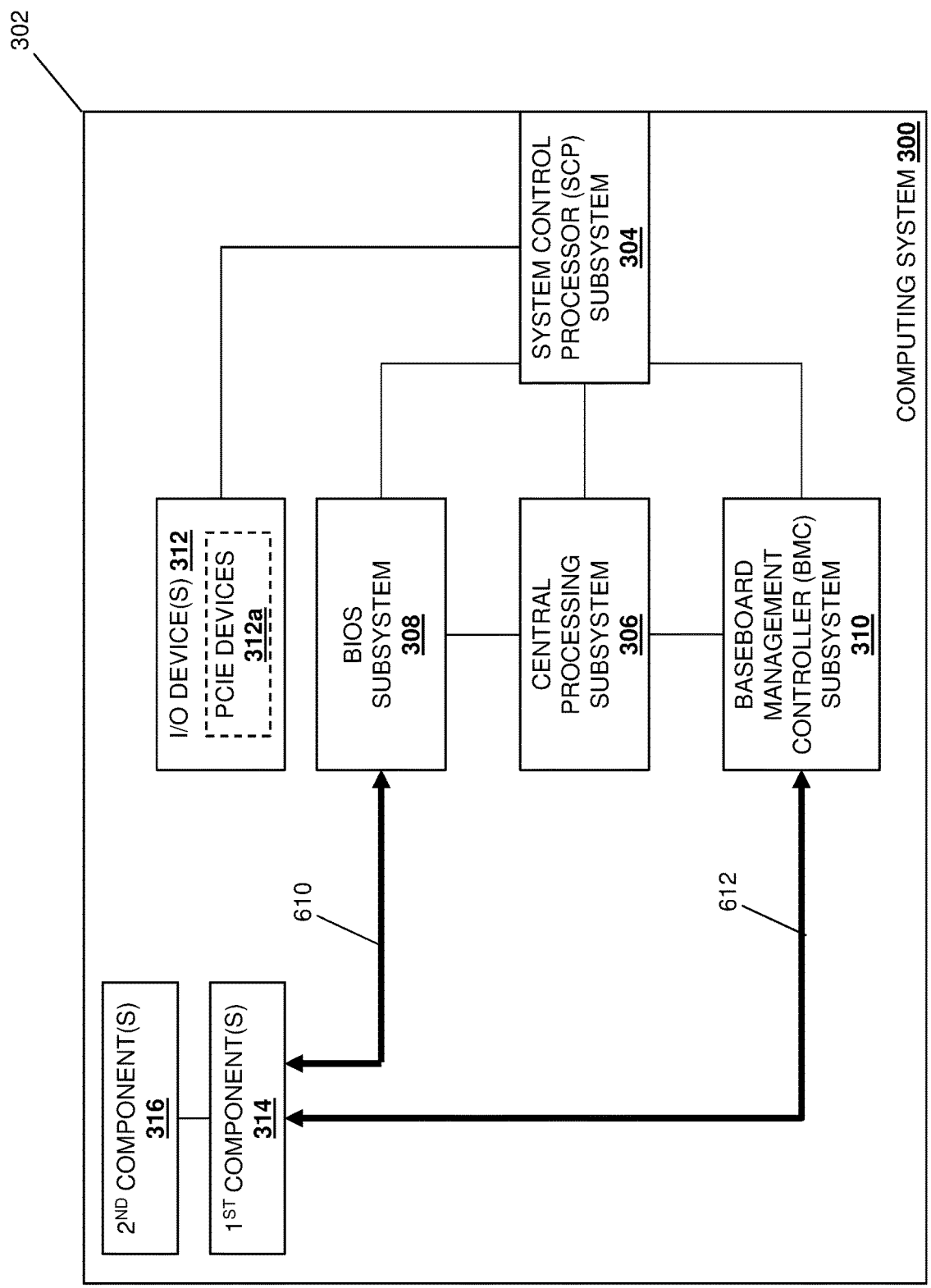
FIG. 6E is a schematic view illustrating an embodiment of the computing system of FIG. 3A operating during the method of FIG. 5.

In some embodiments, the chain-of-trust established by the SCP subsystem 304 with components utilized by the computing system 202a/300 may be extended to other components utilized by the computing system 202a/300. For example, FIG. 6E illustrates how, subsequent to the establishment of the chain-of-trust with the SCP subsystem 304/400, the BIOS subsystem 308 may perform first component validation operations 610, and/or the BMC subsystem 310 may perform first component validation operations 612, in order to validate first component initialization information for the first component(s) 314 (e.g., a CPLD, a power system, etc.) such that those first component(s) may initialize using validated first component initialization information. For example, the BIOS subsystem 308 and/or the BMC subsystem 310 may access first component initialization information (e.g., first component firmware) for the first component(s) 314, and use a public key to determine whether that first component initialization information is signed with an authorized private key.

In response to determining that the first component firmware has been signed with an authorized private key (corresponding to the public key discussed above), the first component firmware becomes "validated" first component firmware. However, one of skill in the art in possession of the present disclosure will appreciate how any of a variety of first component initialization information may be validated to provide validated first component initialization information while remaining within the scope of the present disclosure as well. Furthermore, in the event first component initialization information cannot be validated (e.g., the BIOS subsystem 308 and/or the BMC subsystem 310 determine that the first component firmware has not been signed with an authorized private key corresponding to the public key discussed above), the BIOS subsystem 308 and/or the BMC subsystem 310 may generate an error message, shut down that first component, and/or otherwise prevent further initialization operations for that first component such that it may not be utilized with the computing system 202a/300. However, in some embodiments and in the event first component initialization information cannot be validated, the BIOS subsystem 308 and/or the BMC subsystem 310 may access different first component initialization information (e.g., an earlier version of the first component firmware discussed above, a recovery image for the first component, etc.) and attempt to validate that first component initialization information similarly as discussed above, which one of skill in the art in possession of the present disclosure will recognize may allow that first component 314 to complete initialization operations (i.e., with a different/earlier version of the first component initialization information) such that that first component 314 may proceed with initialization as discussed below.

In an embodiment, following the validation of the first component initialization information, the validated first component initialization information may be used to complete initialization operations for the first components, which one of skill in the art in possession of the present disclosure will recognize may allow the first component(s) 314 to perform any of a variety of first component operations known in the art. Thus, one of skill in the art in possession of the present disclosure will recognize that the use of the "validated" BIOS subsystem 308 and/or the "validated" BMC subsystem 310 to validate the first component initialization information ensures a verified boot or other initialization of the first component(s), extending the "chain of trust" between the SCP subsystem 304/400 and the BIOS/subsystem 308/BMC subsystem 310 to the first components by validating, authenticating, verifying, and/or otherwise ensuring the secure operation of the first components 314 by ensuring that the first component(s) 314 utilizes only secure components (e.g., software, firmware, and/or other components known in the art) as part of any of their operations.

Figure 6F:
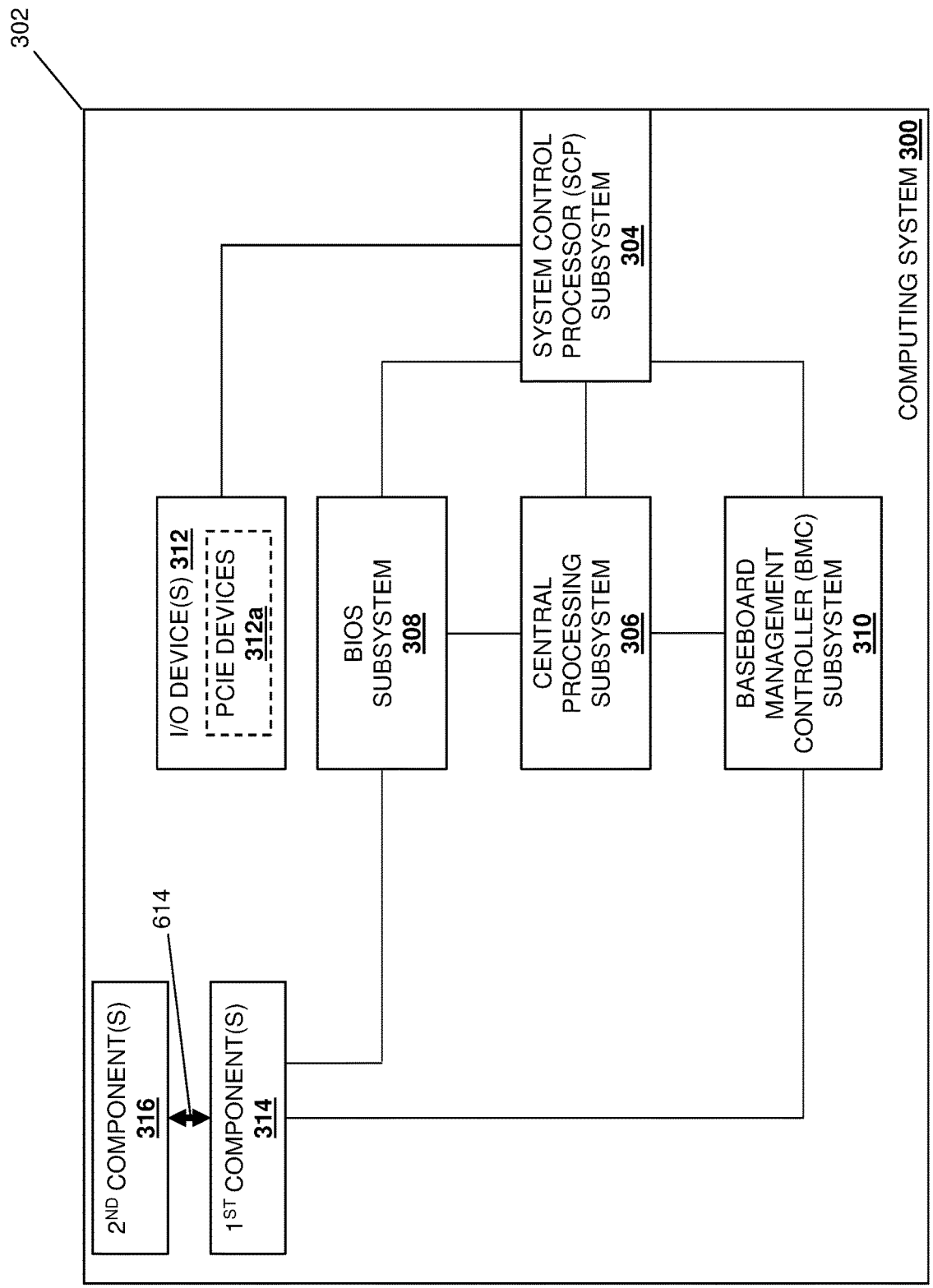
FIG. 6F is a schematic view illustrating an embodiment of the computing system of FIG. 3A operating during the method of FIG. 5.

Furthermore, with reference to FIG. 6F, any of the "validated" first components 314 (e.g., the CPLD discussed above) may perform second component validation operations 614 that are similar to the first component validation operations 612 discussed above, and that one of skill in the art in possession of the present disclosure will recognize operate to validate the second component initialization information and ensure a verified boot or other initialization of the second component(s) 316, extending the "chain of trust" between the SCP subsystem 304/400, the BIOS subsystem 308/BMC subsystem 310, and the first components 314 to the second component(s) 316 by validating, authenticating, verifying, and/or otherwise ensuring the secure operation of the second components 316 by ensuring that the second component(s) 316 utilize only secure components (e.g., software, firmware, and/or other components known in the art) as part of any of their operations. Further still, while not explicitly illustrated or described herein, one of skill in the art in possession of the present disclosure will appreciate how the "validated" I/O device(s) 312 and/or second component(s) 316 may perform similar validation operations in order to extend the chain of trust to any devices, subsystems, and/or other components that they are connected to while remaining within the scope of the present disclosure as well.

Figure 6G:
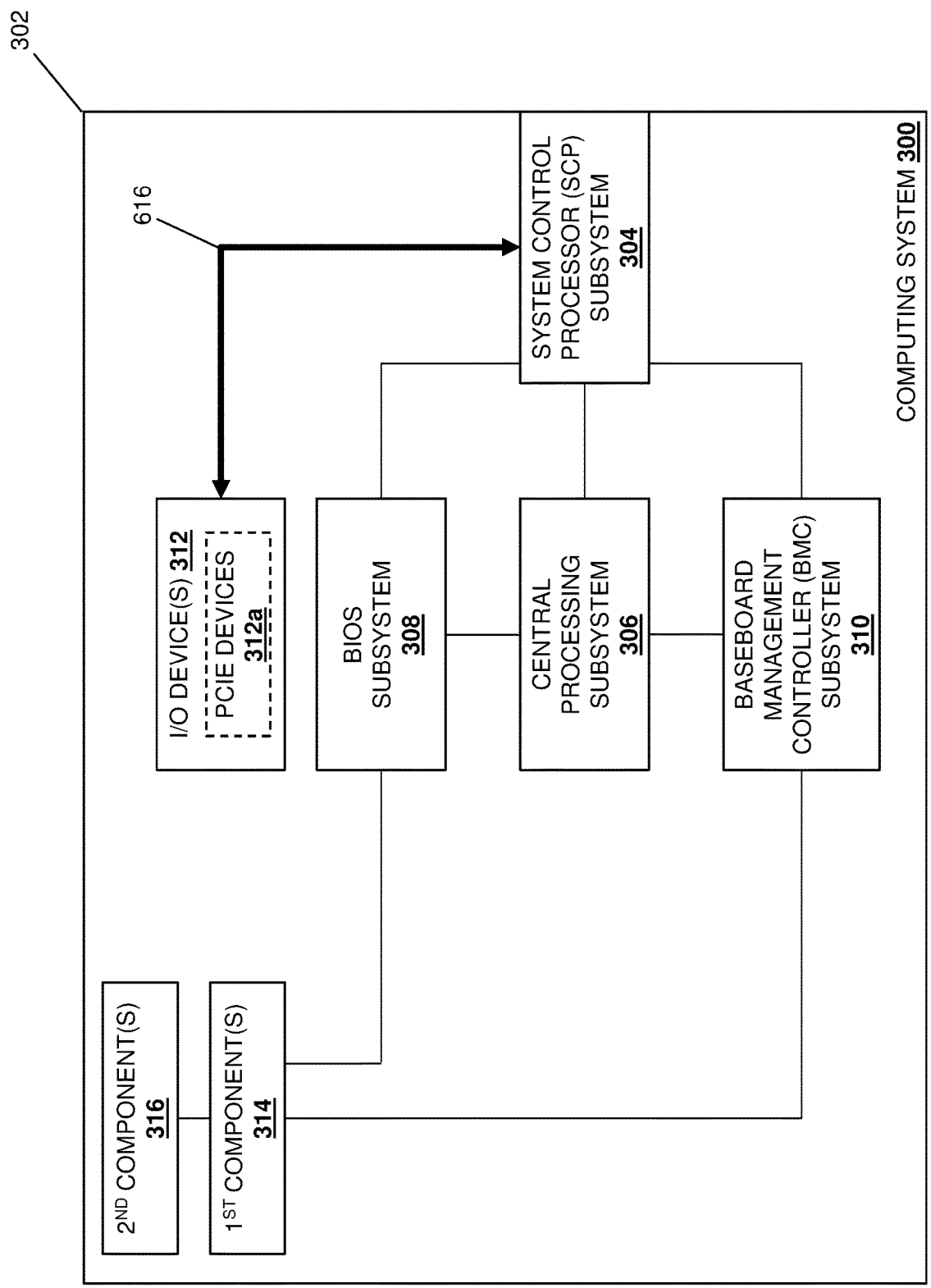
FIG. 6G is a schematic view illustrating an embodiment of the computing system of FIG. 3A operating during the method of FIG. 5.
Figure 6I:
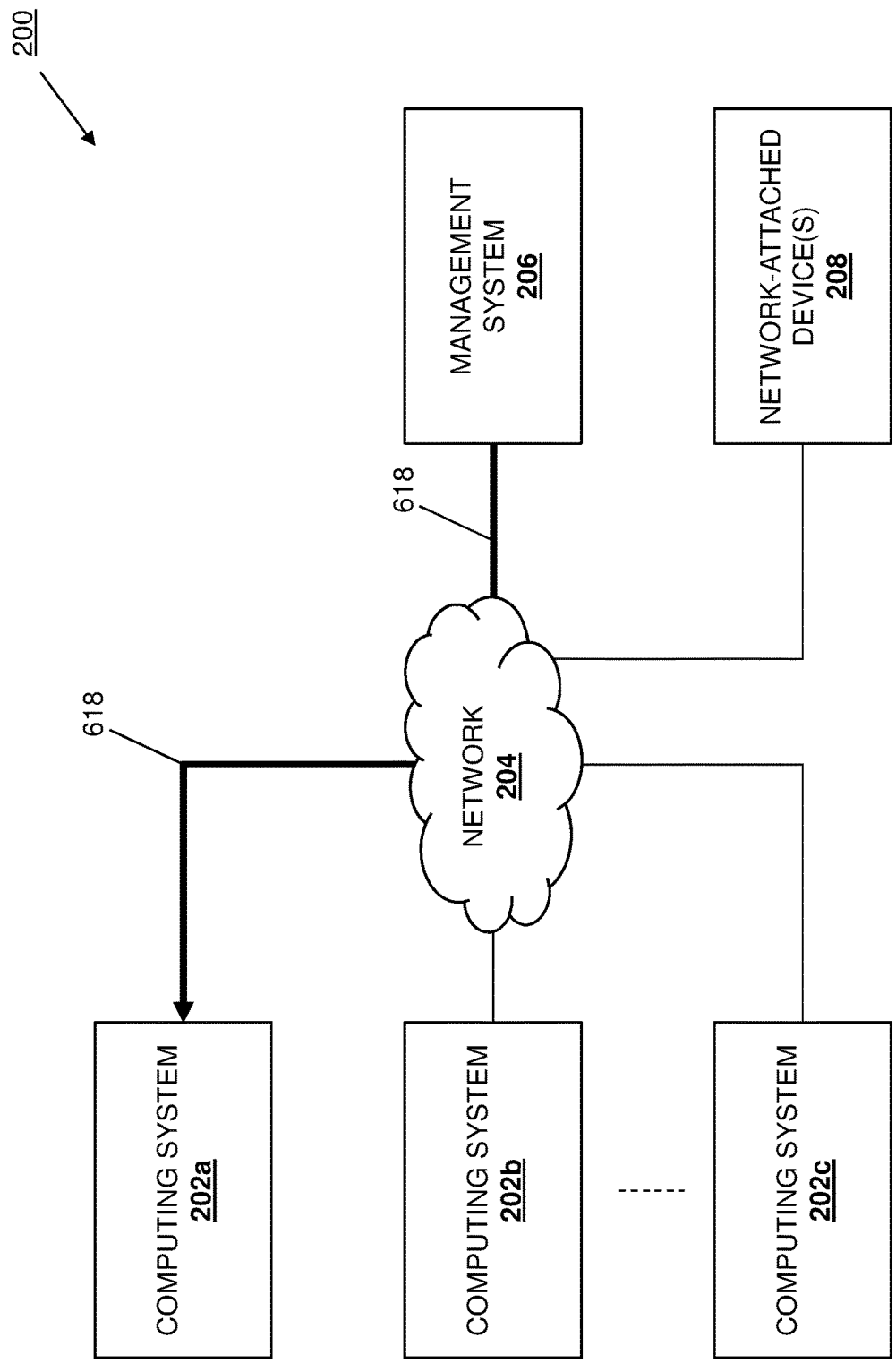
FIG. 6I is a schematic view illustrating an embodiment of the networked system of FIG. 2 operating during the method of FIG. 5.

In some embodiments, following block 518, the method 500 may then proceed to block optional block 520 where the SCP subsystem receives and validates an initialization information update. With reference to FIG. 6G, in an embodiment of optional block 520, the SCP subsystem 304/400 may operate as an initialization information controller hub (e.g., a firmware controller hub) for the computing system 202a/300 by, for example, performing initialization information update operations 616 that include receiving initialization information updates (e.g., firmware updates) for any of the components utilized with the computing system 202a/300 (e.g., the BIOS subsystem, the I/O devices, the BMC subsystem, etc.) via the network 204 from the management system 206. In response to receiving the initialization information updates, the SCP subsystem 304/400 may perform update validation operations that may include verifying that those initialization information updates are signed with a private key (i.e., using a corresponding public key similarly as described above), providing those initialization information updates (e.g., a firmware binary) to their corresponding components so that those components may perform a "second layer validation", and/or via other validation operations known in the art, in order to validate the initialization information updates. As will be appreciated by one of skill in the art in possession of the present disclosure, in the event an information initialization update cannot be validated, it may be discarded, while information initialization updates that are validated provide "validated" initialization information updates that may be used to update initialization information for components utilized with the computing system 202a/300.

The method 500 then proceeds to optional block 522 where the SCP subsystem updates initialization information with the initialization information update. In an embodiment, at optional block 522, the SCP subsystem 304/400 may be configured to update any initialization information for components utilized with the computing system 202a/300 with the validated initialization information updated, received, and validated at optional block 520. For example, the SCP subsystem 304/400 may be configured to prevent in-band updates of any initialization information for components utilized with the computing system 202a/300, and may utilize sideband channels between the SCP subsystem 304/400 and those components to update initialization information for components utilized with the computing system 202a/300 with validated initialization information updates based on initialization information update polic(ies), on-demand (i.e., as soon as those initialization information updates are received), and/or in any other manners that would be apparent to one of skill in the art in possession of the present disclosure.

In some embodiments, following block 518, the method 500 may then proceed to optional block 524 where the SCP subsystem generates a request to erase a portion of a non-volatile storage subsystem on an I/O device. In an embodiment, at optional block 524, the SCP subsystem 304/400 may generate a request to erase a portion of a non-volatile memory subsystem (e.g., a Non-Volatile (NV) "scratch region") on any component utilized with the computing system 202a/300. For example, as will be appreciated by one of skill in the art in possession of the present disclosure, I/O devices (e.g., NVMe storage devices) used with the computing system 202a/300 may also be used with other computing systems (e.g., the computing systems 202b-202c) due to those I/O devices being shared, reallocated, and/or for other reasons that would be apparent to one of skill in the art in possession of the present disclosure. As such, for I/O devices that that may not be utilized with the computing system 202a after some time period, the initialization of those I/O devices may include the SCP subsystem 304/400 generating a request to erase a portion of a non-volatile storage subsystem on that I/O device that may be used to store data or other information that is specific to the computing system 202a/300, and/or otherwise that should not be stored in the I/O device if that I/O device is no longer being used (or not currently being used) with the computing system 202a/300. However, while a specific reason for the erase request generated at optional block 524 is described, one of skill in the art in possession of the present disclosure will appreciate that other reasons for erase requests will fall within the scope of the present disclosure as well.

The method 500 then proceeds to optional block 526 where the SCP subsystem transmits the request to the I/O device. In an embodiment, at optional block 526, the SCP subsystem 304/400 may transmit the erase request generated at optional block 524 to the I/O device, which one of skill in the art in possession of the present disclosure will recognize will cause that I/O device to be configured to allocate a portion of its non-volatile memory subsystem for erasure following its disconnection from the computing system 202a/300, and subsequently store data or other information identified in the erase request in that portion of its non-volatile memory subsystem, followed by the erasure of that portion of its non-volatile memory subsystem in association with the disconnection of the I/O device from the computing system 202a/300.

In some embodiments, following block 518, the method 500 may then proceed to block optional block 528 where the SCP subsystem authenticates a PCIe-I/O device and allows the PCIe-I/O device to operate with a central processing system. In an embodiment, at optional block 528, the SCP subsystem 304/400 may authenticate any devices before allowing those devices to be configured to operate with the computing system 202a/300. For example, the computing system 202a/300 provide a composable platform to which PCIe devices may be added such that the central processing system 306 may utilize those PCIe devices. FIG. 6G illustrate how the SCP subsystem 304/400 may perform authentication operations 616 that may include accessing and authenticating the PCIe device(s) 312a, while FIG. 6H illustrate how the SCP subsystem 304/400 may perform authentication operations 616 that may include accessing and the authenticating network-attached device(s) 208 (which may be provided by PCIe device(s) such as NVMe storage devices) via the network 204. In an embodiment, the authentication of PCIe devices before allowing those PCIe devices to be configured to operate with the central processing system 306 in the computing system 202a/300 may include performing Distributed Management Task Force (DMTF) Security Protocol and Data Model (SPDM)-based attestation operations, verifying any particular PCIe device includes a particular firmware version and configuration settings (e.g., via hash value verification operations performed on firmware), and/or via other authentication operations that would be apparent to one of skill in the art in possession of the present disclosure. Following authentication of any PCIe devices, those devices may be configured to operate with the central processing system 306 in the computing system 202a/300, while any PCIe devices that cannot be authenticated may be prevented from operating with the with the central processing system 306 in the computing system 202a/300. In one example, authentication failures such as determining that a PCIe device does not include a particular firmware version may be remedied by forcing a firmware update on the PCIe device in order to provide the particular firmware version that allows that PCIe device to be authenticated. As such, the SCP subsystem 304/400 may attest any devices for their authenticity before allowing those devices to be configured as part of a composable infrastructure provided by the computing system 202a/300.

Thus, systems and methods have been described that provide a System Control Processor (SCP) subsystem in a computing system that operates as a platform root-of-trust system that consolidates other root-of-trust systems that exist in computing systems with disaggregated system architectures, thus providing a "security hub" for the computing system with regard to internal devices/subsystems, external devices/subsystems, shared devices/subsystem, and/or other disaggregated system components. For example, the platform root-of-trust system of the present disclosure may include an SCP subsystem coupled to a central processing subsystem, a BIOS subsystem, and an I/O device. In response to an initialization instruction, the SCP subsystem begins initialization operations prior to the beginning of initialization operations for the central processing subsystem, the BIOS subsystem, and the I/O device. As part of SCP initialization operations, the SCP subsystem validates SCP subsystem initialization information to provide validated SCP subsystem initialization information, and uses the validated SCP subsystem initialization information to complete the SCP initialization operations. Subsequent to completing the SCP initialization operations, the SCP subsystem validates BIOS subsystem initialization information to provide validated BIOS subsystem initialization information for use by the BIOS subsystem in performing BIOS initialization operations, and validates I/O device initialization information to provide validated I/O device initialization information for use by the I/O device in performing I/O initialization operations. As such, the security of components (i.e., including shared and/or external components) provided for use by a computing system may be verified, thus ensuring that those components are not compromised, and preventing compromise of the computing system to prevent, for example, access to secure portions of that computing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A platform root-of-trust system, comprising:
   a central processing subsystem;
   a Basic Input/Output System (BIOS) subsystem;
   an Input/Output (I/O) device; and
   a System Control Processor (SCP) subsystem that is coupled to the central processing subsystem, the BIOS subsystem, and the I/O device, wherein the SCP subsystem is configured to:
      begin, in response to an initialization instruction, initialization operations for the SCP subsystem prior to the beginning of initialization operations for the central processing subsystem, the BIOS subsystem, and the I/O device;
      validate, as part of the initialization operations for the SCP subsystem, SCP subsystem initialization information to provide validated SCP subsystem initialization information;
      complete, using the validated SCP subsystem initialization information, the initialization operations for the SCP subsystem;
      validate, subsequent to completing the initialization operations for the SCP subsystem, BIOS subsystem initialization information to provide validated BIOS subsystem initialization information, wherein the BIOS subsystem performs initialization operations for the BIOS subsystem using the validated BIOS subsystem initialization information; and
      validate, subsequent to completing the initialization operations for the SCP subsystem, I/O device initialization information to provide validated I/O device initialization information, wherein the I/O device performs initialization operations for the I/O device using the validated I/O device initialization information.

2. The system of claim 1, wherein the SCP subsystem includes at least one root-of-trust component that is configured to provide for the validation of the SCP subsystem initialization information by:
   storing read-only instructions on a read-only SCP memory subsystem that is included in the SCP subsystem, wherein the read-only instruction are the first instructions executed subsequent to beginning the initialization operations for the SCP subsystem;
   executing the read-only instructions to use a public key to verify that the SCP subsystem initialization information has been signed with a private key in order to provide the validated SCP subsystem initialization information.

3. The system of claim 1, further comprising:
   a Baseboard Management Controller (BMC) subsystem that is coupled to the SCP subsystem, wherein the SCP subsystem is configured to:
      begin, in response to the initialization instruction, initialization operations for the SCP subsystem prior to the beginning of initialization operations for the BMC subsystem; and
      validate, subsequent to completing the initialization operations for the SCP subsystem, BMC subsystem initialization information to provide validated BMC subsystem initialization information, wherein the BMC subsystem performs initialization operations for the BMC subsystem using the validated BMC subsystem initialization information.

4. The system of claim 1, wherein the SCP subsystem is configured to:
   perform at least one Baseboard Management Controller (BMC) remote-management operation.

5. The system of claim 1, wherein the SCP subsystem is configured to:
   receive an update for at least one of the BIOS subsystem initialization information and the I/O device initialization information;
   validate the update received for the at least one of the BIOS subsystem initialization information and the I/O device initialization information to provide at least one verified update; and
   replace the at least one of the BIOS subsystem initialization information and the I/O device initialization information with the at least one verified update.

6. The system of claim 1, wherein the SCP subsystem is configured to:
   generate, a request to erase a portion of a non-volatile storage subsystem on the I/O device; and
   transmit, to the I/O device, the request to erase the portion of the non-volatile storage subsystem on the I/O device.

7. A System Control Processor (SCP) subsystem, comprising:
   a System Control Processor (SCP) processing system; and
   an SCP memory system that is coupled to the SCP processing system and that includes instructions that, when executed by the SCP processing system, cause the SCP processing system to provide an SCP engine that is configured to:
      begin, in response to an initialization instruction, initialization operations for the SCP subsystem prior to the beginning of initialization operations for a central processing subsystem that is coupled to the SPC subsystem, a BIOS subsystem that is coupled to the SCP subsystem, and an I/O device that is coupled to the SCP subsystem;

validate, as part of the initialization operations for the SCP subsystem, SCP subsystem initialization information to provide validated SCP subsystem initialization information;

complete, using the validated SCP subsystem initialization information, the initialization operations for the SCP subsystem;

validate, subsequent to completing the initialization operations for the SCP subsystem, BIOS subsystem initialization information to provide validated BIOS subsystem initialization information that is configured for use by the BIOS subsystem to perform initialization operations for the BIOS subsystem; and validate, subsequent to completing the initialization operations for the SCP subsystem, I/O device initialization information to provide validated I/O device initialization information that is configured for use by the I/O device to perform initialization operations for the I/O device.

8. The SCP subsystem of claim 7, further comprising:

at least one root-of-trust component that includes:
- a read-only SCP memory subsystem that is included in the SCP memory system and that stores read-only instructions that are the first instructions executed subsequent to beginning the initialization operations for the SCP subsystem; and
- the SCP processing system that executes the read-only instructions to use a public key to verify that the SCP subsystem initialization information has been signed with a private key in order to provide the validated SCP subsystem initialization information.

9. The SCP subsystem of claim 7, wherein the SCP engine is configured to:

begin, in response to the initialization instruction, initialization operations for the SCP subsystem prior to the beginning of initialization operations for a Baseboard Management Controller (BMC) subsystem that is coupled to the SCP subsystem; and validate, subsequent to completing the initialization operations for the SCP subsystem, BMC subsystem initialization information to provide validated BMC subsystem initialization information that is configured for use by the BMC subsystem to perform initialization operations for the BMC subsystem.

10. The SCP subsystem of claim 7, wherein the SCP engine is configured to:

perform at least one Baseboard Management Controller (BMC) remote-management operation.

11. The SCP subsystem of claim 7, wherein the SCP engine is configured to:

receive an update for at least one of the BIOS subsystem initialization information and the I/O device initialization information;

validate the update received for the at least one of the BIOS subsystem initialization information and the I/O device initialization information to provide at least one verified update; and replace the at least one of the BIOS subsystem initialization information and the I/O device initialization information with the at least one verified update.

12. The SCP subsystem of claim 7, wherein the SCP engine is configured to:

generate, a request to erase a portion of a non-volatile storage subsystem on the I/O device; and transmit, to the I/O device, the request to erase the portion of the non-volatile storage subsystem on the I/O device.

13. The SCP subsystem of claim 7, wherein the I/O device is a Peripheral Component Interconnect express (PCIe) device, and wherein the SCP engine is configured to:

authenticate the PCIe device; and allow, in response to authenticating the PCIe device, the PCIe device to operate with the central processing subsystem.

14. A method for providing a platform root-of-trust, comprising:

beginning, by a System Control Processor (SCP) subsystem in response to an initialization instruction, initialization operations for the SCP subsystem prior to the beginning of initialization operations for a central processing subsystem that is coupled to the SCP subsystem, a BIOS subsystem that is coupled to the SCP subsystem, and an I/O device that is coupled to the SCP subsystem;

validating, by the SCP subsystem as part of the initialization operations for the SCP subsystem, SCP subsystem initialization information to provide validated SCP subsystem initialization information;

completing, by the SCP subsystem using the validated SCP subsystem initialization information, the initialization operations for the SCP subsystem;

validating, by the SCP subsystem subsequent to completing the initialization operations for the SCP subsystem, BIOS subsystem initialization information to provide validated BIOS subsystem initialization information that is configured for use by the BIOS subsystem to perform initialization operations for the BIOS subsystem; and validating, by the SCP subsystem subsequent to completing the initialization operations for the SCP subsystem, I/O device initialization information to provide validated I/O device initialization information that are configured for use by the I/O device to perform initialization operations for the I/O device.

15. The method of claim 14, wherein the SCP subsystem includes at least one root-of-trust component that is configured to provide for the validation of the SCP subsystem initialization information by:

storing read-only instructions on a read-only SCP memory subsystem that is included in the SCP subsystem, wherein the read-only instruction are the first instructions executed subsequent to beginning the initialization operations for the SCP subsystem;

executing the read-only instructions to use a public key to verify that the SCP subsystem initialization information has been signed with a private key in order to provide the validated SCP subsystem initialization information.

16. The method of claim 14, further comprising:

beginning, by the SCP subsystem in response to the initialization instruction, initialization operations for the SCP subsystem prior to the beginning of initialization operations for a Baseboard Management Controller (BMC) subsystem that is coupled to the SCP subsystem; and validating, subsequent to completing the initialization operations for the SCP subsystem, BMC subsystem initialization information to provide validated BMC subsystem initialization information that is configured for use by the BMC subsystem to perform initialization operations for the BMC subsystem.

17. The method of claim 14, further comprising:
performing at least one Baseboard Management Controller (BMC) remote-management operation.

18. The method of claim 14, further comprising:
receiving, by the SCP subsystem, an update for at least one of the BIOS subsystem initialization information and the I/O device initialization information;
validating, by the SCP subsystem, the update received for the at least one of the BIOS subsystem initialization information and the I/O device initialization information to provide at least one verified update; and
replacing, by the SCP subsystem, the at least one of the BIOS subsystem initialization information and the I/O device initialization information with the at least one verified update.

19. The method of claim 14, further comprising:
generating, by the SCP subsystem a request to erase a portion of a non-volatile storage subsystem on the I/O device; and
transmitting, by the SCP subsystem to the I/O device, the request to erase the portion of the non-volatile storage subsystem on the I/O device.

20. The method of claim 14, further comprising:
authenticating, by the SCP subsystem, a Peripheral Component Interconnect express (PCIe) device that provides the I/O device; and
allowing, by the SCP subsystem in response to authenticating the PCIe device, the PCIe device to operate with the central processing subsystem.

\* \* \* \* \*